(12) United States Patent
Sun et al.

(10) Patent No.: US 11,843,797 B2
(45) Date of Patent: *Dec. 12, 2023

(54) CONTENT ADAPTIVE DEBLOCKING DURING VIDEO ENCODING AND DECODING

(71) Applicant: Microsoft Technology Licensing, LLC, Redmond, WA (US)

(72) Inventors: Xiaoyan Sun, Beijing (CN); Zhiwei Xiong, Beijing (CN); Feng Wu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/983,263

(22) Filed: Nov. 8, 2022

(65) Prior Publication Data
US 2023/0059434 A1  Feb. 23, 2023

Related U.S. Application Data

(63) Continuation of application No. 17/188,784, filed on Mar. 1, 2021, now Pat. No. 11,528,499, which is a
(Continued)

(51) Int. Cl.
*H04N 19/51* (2014.01)
*H04N 19/80* (2014.01)
(Continued)

(52) U.S. Cl.
CPC ........... *H04N 19/51* (2014.11); *H04N 19/117* (2014.11); *H04N 19/14* (2014.11); *H04N 19/176* (2014.11); *H04N 19/80* (2014.11); *H04N 19/86* (2014.11)

(58) Field of Classification Search
None
See application file for complete search history.

(56) References Cited

U.S. PATENT DOCUMENTS

| 2005/0286795 | A1* | 12/2005 | Zhang | H04N 19/117 |
|---|---|---|---|---|
| | | | | 382/268 |
| 2008/0095244 | A1* | 4/2008 | Kim | H04N 19/527 |
| | | | | 375/E7.189 |

(Continued)

OTHER PUBLICATIONS

Non Final Office Action Issued in U.S. Appl. No. 17/983,287, dated Aug. 3, 2023, 9 Pages.

*Primary Examiner* — Peter D Le
(74) *Attorney, Agent, or Firm* — Klarquist Sparkman, LLP

(57) ABSTRACT

Disclosed herein are exemplary embodiments of methods, apparatus, and systems for performing content-adaptive deblocking to improve the visual quality of video images compressed using block-based motion-predictive video coding. For instance, in certain embodiments of the disclosed technology, edge information is obtained using global orientation energy edge detection ("OEED") techniques on an initially deblocked image. OEED detection can provide a robust partition of local directional features ("LDFs"). For a local directional feature detected in the partition, a directional deblocking filter having an orientation corresponding to the orientation of the LDF can be used. The selected filter can have a filter orientation and activation thresholds that better preserve image details while reducing blocking artifacts. In certain embodiments, for a consecutive non-LDF region, extra smoothing can be imposed to suppress the visually severe blocking artifacts.

20 Claims, 16 Drawing Sheets
(7 of 16 Drawing Sheet(s) Filed in Color)

Related U.S. Application Data continuation of application No. 16/404,534, filed on May 6, 2019, now Pat. No. 10,965,950, which is a continuation of application No. 14/336,913, filed on Jul. 21, 2014, now Pat. No. 10,284,868, which is a continuation of application No. 12/924,836, filed on Oct. 5, 2010, now Pat. No. 8,787,443.

(51) Int. Cl.
*H04N 19/176* (2014.01)
*H04N 19/117* (2014.01)
*H04N 19/14* (2014.01)
*H04N 19/86* (2014.01)

(56) References Cited

U.S. PATENT DOCUMENTS

| | | | |
|---|---|---|---|
| 2009/0122864 A1* | 5/2009 | Palfner | H04N 19/174 375/E7.243 |
| 2009/0327386 A1* | 12/2009 | Schoenblum | H04N 19/176 708/400 |
| 2011/0103490 A1* | 5/2011 | Kuo | H04N 19/61 375/E7.193 |

* cited by examiner

| Sequence | QP | Bit rate (Kbps) | H.264/AVC | | | intra-predictive | | | exemplary embodiment | | | Mode B (%) | Mode C (%) |
|---|---|---|---|---|---|---|---|---|---|---|---|---|---|
| | | | Y | U | V | Y | U | V | Y | U | V | | |
| Foreman (CIF, 10fps) | 32 | 89.23 | 35.20 | 39.91 | 42.00 | 35.20 | 39.04 | 42.01 | 35.23 | 39.98 | 42.02 | 1.5 | 59.3 |
| | 38 | 42.51 | 31.86 | 38.33 | 39.59 | 31.86 | 38.34 | 39.61 | 31.88 | 38.36 | 39.63 | 3.0 | 49.2 |
| BasketballDrill (WVGA, 10fps) | 32 | 646.94 | 35.27 | 37.79 | 37.85 | 35.30 | 37.82 | 37.86 | 35.31 | 37.87 | 37.95 | 1.5 | 58.9 |
| | 38 | 312.40 | 32.25 | 35.48 | 35.28 | 32.26 | 35.54 | 35.32 | 32.30 | 35.57 | 35.40 | 7.2 | 39.6 |
| BQTerrace (1080p, 12fps) | 32 | 2491.60 | 34.07 | 39.08 | 41.71 | 34.07 | 39.09 | 41.72 | 34.07 | 39.10 | 41.74 | 8.6 | 37.7 |
| | 38 | 928.99 | 31.53 | 37.91 | 40.50 | 31.53 | 37.90 | 40.50 | 31.53 | 37.92 | 40.51 | 9.6 | 28.1 |
| ParkScene (1080p, 12fps) | 32 | 2012.69 | 34.92 | 38.00 | 39.40 | 34.95 | 38.02 | 39.42 | 34.94 | 38.02 | 39.42 | 18.8 | 19.2 |
| | 38 | 794.00 | 31.83 | 36.61 | 38.31 | 31.83 | 36.61 | 38.31 | 31.83 | 36.62 | 38.32 | 21.8 | 12.3 |

FIG. 20

CONTENT ADAPTIVE DEBLOCKING DURING VIDEO ENCODING AND DECODING

CROSS REFERENCE TO RELATED APPLICATIONS

This application is a continuation of U.S. patent application Ser. No. 17/188,784, filed Mar. 1, 2021, which is a continuation of U.S. patent application Ser. No. 16/404,534, filed May 6, 2019, now U.S. Pat. No. 10,965,950, which is a continuation of U.S. patent application Ser. No. 14/336,913, filed Jul. 21, 2014, now U.S. Pat. No. 10,284,868, which is a continuation of U.S. patent application Ser. No. 12/924,836, filed Oct. 5, 2010, now U.S. Pat. No. 8,787,443, which is hereby incorporated by reference.

FIELD

This application relates to deblocking schemes applied during block-based motion-predictive video encoding or decoding.

BACKGROUND

Block-based motion-predictive video coding is one of the most commonly used techniques for video compression. Standards such as MPEG-2, MPEG-4, Windows Media Video ("WMV") versions 7/8/9, VC-1, and H.264, are based on block-based motion-video predictive coding techniques. These video compression techniques typically encode individual frames of video using intraframe compression or interframe compression. Intraframe compression techniques compress an individual frame without reference to video data from other frames. Such frames are typically referred to as "I-frames" or "key frames." Interframe compression techniques compress frames with reference to preceding frames or with reference to both preceding and subsequent frames. Frames compressed with reference to preceding frames are typically referred to as "predicted frames" or "P-frames," whereas frames compressed with reference to both preceding and subsequent frames are referred to as "B-frames" or "bidirectionally predicted frames."

The common detriment of block-based techniques is the creation of artificial illusory boundaries, or contours, between blocks in the decompressed video. These contours are referred to as "block artifacts," "blocking artifacts," or "blockiness." Blockiness is generally worse when the video bit rate is lower and is highly undesirable.

Many techniques have been proposed to reduce block artifacts, including overlapped motion compensation, wavelets, large-support transforms, and deblocking filters. Of these, only deblocking filters have been found to be useful and effective for practical and commercial video encoders. A deblocking filter in video coding is a filter that smooths out block boundaries in a decompressed video frame using a set of rules that is implicitly derived from data known to the decoder. In other words, deblocking filters generally require no additional information to be sent in or with the compressed video stream.

Furthermore, deblocking filters are sometimes used selectively or varied in strength depending on the particular use. For example, the strength of the deblocking filter used in the H.264/AVC standard is adjusted based on the block types (intra or inter) and on whether the blocks contain coded coefficients. Furthermore, the H.264/AVC deblocking filter is disabled for a block when the intensity difference between boundary pixels in two adjacent blocks indicates that there is a significant change across the block boundary. Such a significant change indicates that the block edge is more likely to be an original image feature rather than a blocking distortion caused by a block artifact. For the H.264/AVC filter, the thresholds defining whether a significant change is present depend on the quantization parameter ("QP").

Although the deblocking scheme described in the H.264/AVC standard helps reduce some blocking artifacts, the scheme suffers from a number of disadvantages. First, deblocking is always performed along the direction perpendicular to the block boundary (either horizontally or vertically), without any consideration for local features inside the block. Such a scheme is therefore not equipped to account for and properly filter image edges that are oriented in non-horizontal and non-vertical orientations, which can be the large majority of edges in an image. Further, the same filter orientation and thresholds are applied to highly different image content, which can potentially degrade the deblocking performance.

Additionally, large smooth regions in video images can be the source for significant blocking artifacts. In particular, for high resolution videos compressed at a low bit-rate, the most visually annoying artifacts sometimes appear in a large smooth region that has only a small color or intensity variation across the region. Although the blocking degradation in such regions is reduced to a certain extent using standard deblocking schemes (such as the H.264/AVC deblocking scheme), significant blockiness still visibly exists spatially and temporally. This blocking is often highly apparent and can heavily impair the perceptual experience of the audience.

SUMMARY

Disclosed below are representative embodiments of methods, apparatus, and systems for performing content-adaptive deblocking to improve the visual quality of video images compressed using block-based motion-predictive video coding. For example, in certain embodiments of the disclosed technology, edge information is obtained using global orientation energy edge detection ("OEED") techniques on an initially deblocked image. OEED detection can provide a robust partition of local directional features ("LDFs"). For a local directional feature detected in the partition, a directional deblocking filter having an orientation corresponding to the orientation of the LDF can be used. The selected filter can have a filter orientation and activation thresholds that better preserve image details while reducing blocking artifacts. In certain embodiments, for a consecutive non-LDF region, extra smoothing can be imposed to suppress the visually severe blocking artifacts. Experimental results presented herein demonstrate that embodiments of the disclosed technology can effectively improve the visual quality while maintaining the objective fidelity of videos compressed using block-based motion-predictive video coding.

Some of the exemplary methods disclosed herein comprise, for example, buffering a video frame reconstructed during block-based motion-predictive encoding or decoding; determining edge locations and edge orientations throughout one or more blocks in the video frame; for a selected block of the one or more blocks in the video frame, selecting a deblocking filter from two or more candidate deblocking filters based at least in part on the edge orientations in the selected block; and applying the selected deblocking filter to the selected block and one or more blocks neighboring the selected block. In certain implementations, the determining the edge locations and the edge orientations comprises partitioning the blocks of the video frame into blocks having local directional features and blocks having no local directional features using orientation energy edge detection. In some implementations, the determining the edge locations and the edge orientations comprises applying two or more orientation energy filters, at least one of the orientation energy filters being in a non-vertical and non-horizontal orientation. In certain implementations, the determining the edge locations and the edge orientations comprises applying sets of one or more Gaussian derivative filters, each set of the one or more Gaussian derivative filters having Gaussian derivative filters at an orientation different from the Gaussian derivative filters of the other sets. In some implementations, the sets of one or more Gaussian derivative filters comprise a first Gaussian derivative filter and a second Gaussian derivative filter. For example, in one particular implementation, eight sets of one or more Gaussian derivative filters are applied, six of the eight sets being at a non-horizontal and non-vertical orientation. In certain implementations, the method further comprises applying a deblocking filter to luminance values of the video image before the edge locations and the edge orientations are determined. In some implementations, the method is performed in a motion estimation/compensation loop of an encoder or in a motion compensation loop of a decoder. In certain implementations, the act of selecting a deblocking filter comprises determining whether the selected block has directional features that are consistent with directional features of the one or more blocks neighboring the selected block. For example, the determination of whether the selected block has directional features that are consistent with the directional features of the one or more blocks neighboring the selected block can be based at least in part on one or more of an average orientation of edge pixels and an orientation variance of the edge pixels.

Certain exemplary methods disclosed herein comprise, for example, buffering a video frame reconstructed during block-based motion-predictive encoding or decoding; for a selected block in the video frame, determining whether the selected block is in a region with no local directional features; selecting one of a plurality of filters to apply to the selected block based at least in part on the determination of whether the selected block is in a region with no local directional features; and applying the selected filter to the selected block. In certain implementations, the region with no local directional features comprises the selected block and one or more adjacent blocks to the selected block. In some implementations, the selecting comprises selecting a smoothing filter when the selected block is determined to be in a region with no local directional features. In certain implementations, the determining whether the selected block is in a region with no local directional features comprises determining whether a sum of intensity variations in the selected block and in one or more adjacent blocks satisfy a threshold value. In some implementations, the determining whether the selected block is in a region with no local directional features further comprises partitioning the decoded image into blocks having local directional features and blocks having no local directional features using an edge detection filter and determining that the selected block has no local directional features based at least in part on the partitioning. In certain implementations, the method is performed in a motion estimation/compensation loop of an encoder or in a motion estimation loop of a decoder.

Some of the exemplary methods disclosed herein comprise, for example, detecting edge locations and edge orientations in a video image; for a block of the video image having a detected edge, selecting a directional deblocking filter having a non-horizontal and non-vertical orientation; evaluating one or more application thresholds for the selected directional deblocking filter; if the application thresholds for the directional deblocking filter are satisfied, applying the directional deblocking filter across a boundary of the block and at least one adjacent block; and if the application thresholds for the directional deblocking filter are not satisfied, applying no deblocking filter to the block. In certain implementations, the edge orientations are detected by applying two or more orientation energy filters to the video image. In some implementations, at least one of the application thresholds for the selected directional deblocking filter is dependent on the orientation of the selected directional deblocking filter. In certain implementations, the block is a first block, and the method further comprises, for a second block of the video image having no detected edge, determining that the second block has one or more adjacent blocks that also have no detected edge; and applying a smoothing filter to pixels in the second block and the one or more adjacent blocks.

Embodiments of the disclosed methods can be performed using computing devices, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives)). Such software can be executed on a single computer or on a networked computer (e.g., via the Internet, a wide-area network, a local-area network, a client-server network, or other such network). Embodiments of the disclosed methods can also be performed by specialized computing devices (e.g., one or more application specific integrated circuits ("ASICs"), graphic processing units ("GPUs"), or programmable logic devices (such as field programmable gate arrays ("FPGAs")) configured to perform any of the disclosed methods). Additionally, any intermediate or final result created or modified using any of the disclosed methods can be stored on one or more non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions for causing a computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 20 shows a table with experimental results obtained when testing an embodiment of the disclosed deblocking processes.

DETAILED DESCRIPTION

I. General Considerations

Figure 1:
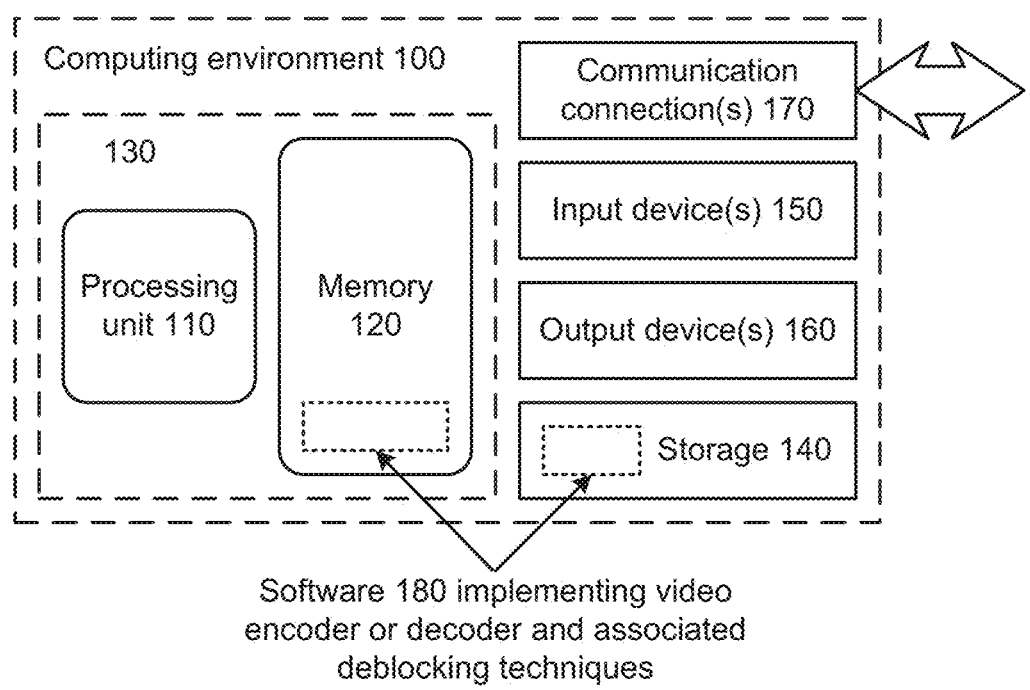
FIG. 1 is a schematic block diagram of an exemplary computing environment in which embodiments of the disclosed technology can be implemented.

Disclosed below are representative embodiments of methods, apparatus, and systems for performing content-adaptive deblocking to improve the visual quality of video images compressed using block-based motion-predictive video coding. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems.

The disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer or image processor embedded in a device, such as a laptop computer, net book, web book, tablet computing device, smart phone, or other mobile computing device). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. Likewise, embodiments of the disclosed technology are not limited to any particular computer or type of hardware. Exemplary computing environments suitable for performing any of the disclosed software-based methods are introduced below.

The disclosed methods can also be implemented using specialized computing hardware that is configured to perform any of the disclosed methods. For example, the disclosed methods can be implemented by an integrated circuit (e.g., an application specific integrated circuit ("ASIC"), a graphics processing unit ("GPU"), or programmable logic device ("PLD"), such as a field programmable gate array ("FPGA")) specially designed to implement any of the disclosed methods (e.g., dedicated hardware configured to perform any of the disclosed image processing techniques).

A. Exemplary Computing Environments

FIG. 1 illustrates a generalized example of a suitable computing device environment or computing hardware environment 100 in which embodiments of the disclosed technology can be implemented. For example, encoders or decoders configured to perform any of the disclosed deblocking techniques can be implemented using embodiments of the computing hardware environment 100. The computing hardware environment 100 is not intended to suggest any limitation as to the scope of use or functionality of the disclosed technology, as the technology can be implemented in diverse general-purpose or special-purpose computing environments.

With reference to FIG. 1, the computing hardware environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 can be volatile memory (e.g., registers, cache, RAM, DRAM, SRAM), non-volatile memory (e.g., ROM, EEPROM, flash memory), or some combination of the two. The memory 120 can store software 180 for implementing one or more of the disclosed deblocking techniques. For example, the memory 120 can store software 180 for implementing any of the disclosed methods.

The computing hardware environment can have additional features. For example, the computing hardware environment 100 includes a storage device 140, one or more input devices 150, one or more output devices 160, and one or more communication connections 170. An interconnection mechanism (not shown) such as a bus, controller, or network interconnects the components of the computing hardware environment 100. Typically, operating system software (not shown) provides an operating environment for other software executing in the computing hardware environment 100, and coordinates activities of the components of the computing hardware environment 100.

The storage device 140 is a type of non-volatile memory and can be removable or non-removable. The storage device 140 includes, for instance, magnetic disks (e.g., hard drives), magnetic tapes or cassettes, optical storage media (e.g., CD-ROMs or DVDs), or any other tangible non-transitory storage medium that can be used to store information and which can be accessed within or by the computing hardware environment 100. The storage device 140 can also store the software 180 for implementing any of the described techniques.

The input device(s) 150 can be a touch input device such as a keyboard, mouse, touch screen, pen, trackball, a voice input device, a scanning device, or another device that provides input to the computing environment 100. The output device(s) 160 can be a display device, touch screen, printer, speaker, CD-writer, or another device that provides output from the computing environment 100.

The communication connection(s) 170 enable communication over a communication medium to another computing entity. The communication medium conveys information such as computer-executable instructions, any of the intermediate or final messages or data used in implementing embodiments of the disclosed technology. By way of example, and not limitation, communication media include wired or wireless techniques implemented with an electrical, optical, RF, infrared, acoustic, or other carrier.

The various methods disclosed herein (e.g., any of the disclosed deblocking techniques) can be described in the general context of computer-executable instructions stored on one or more computer-readable media (e.g., tangible non-transitory computer-readable media such as memory 120 and storage 140). The various methods disclosed herein can also be described in the general context of computer-executable instructions, such as those included in program modules, being executed by a processor in a computing environment. Generally, program modules include routines, programs, libraries, objects, classes, components, data structures, etc. that perform particular tasks or implement particular abstract data types. The functionality of the program modules may be combined or split between program modules as desired in various embodiments. Any of the disclosed methods can also be performed using a distributed computing environment (e.g., a client-server network, cloud computing environment, wide area network, or local area network).

B. Examples of Generalized Video Encoder and Decoders

Figure 2:
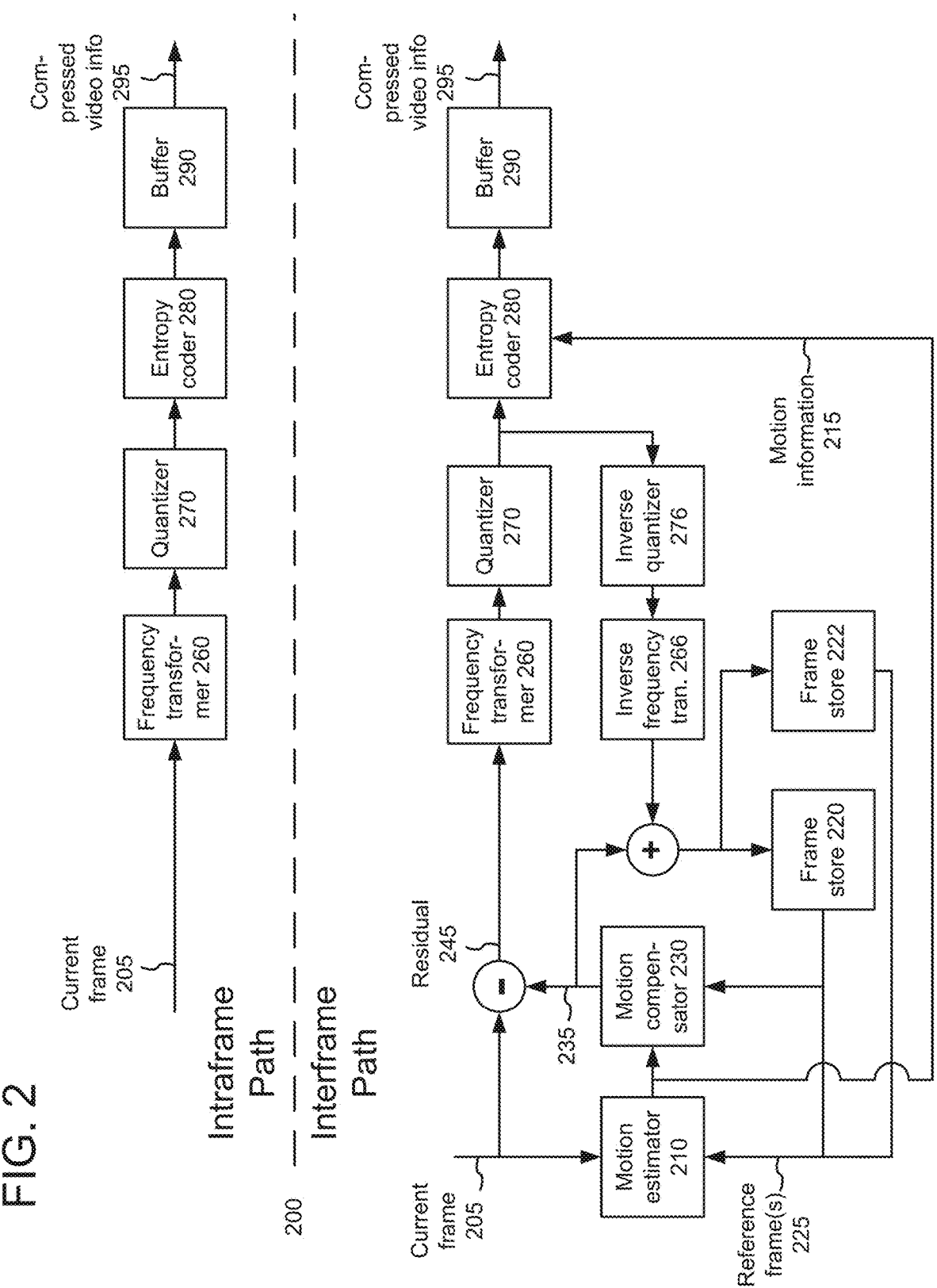
FIG. 2 is a schematic block diagram of a generalized encoder in which embodiments of the disclosed deblocking techniques can be used.
Figure 3:
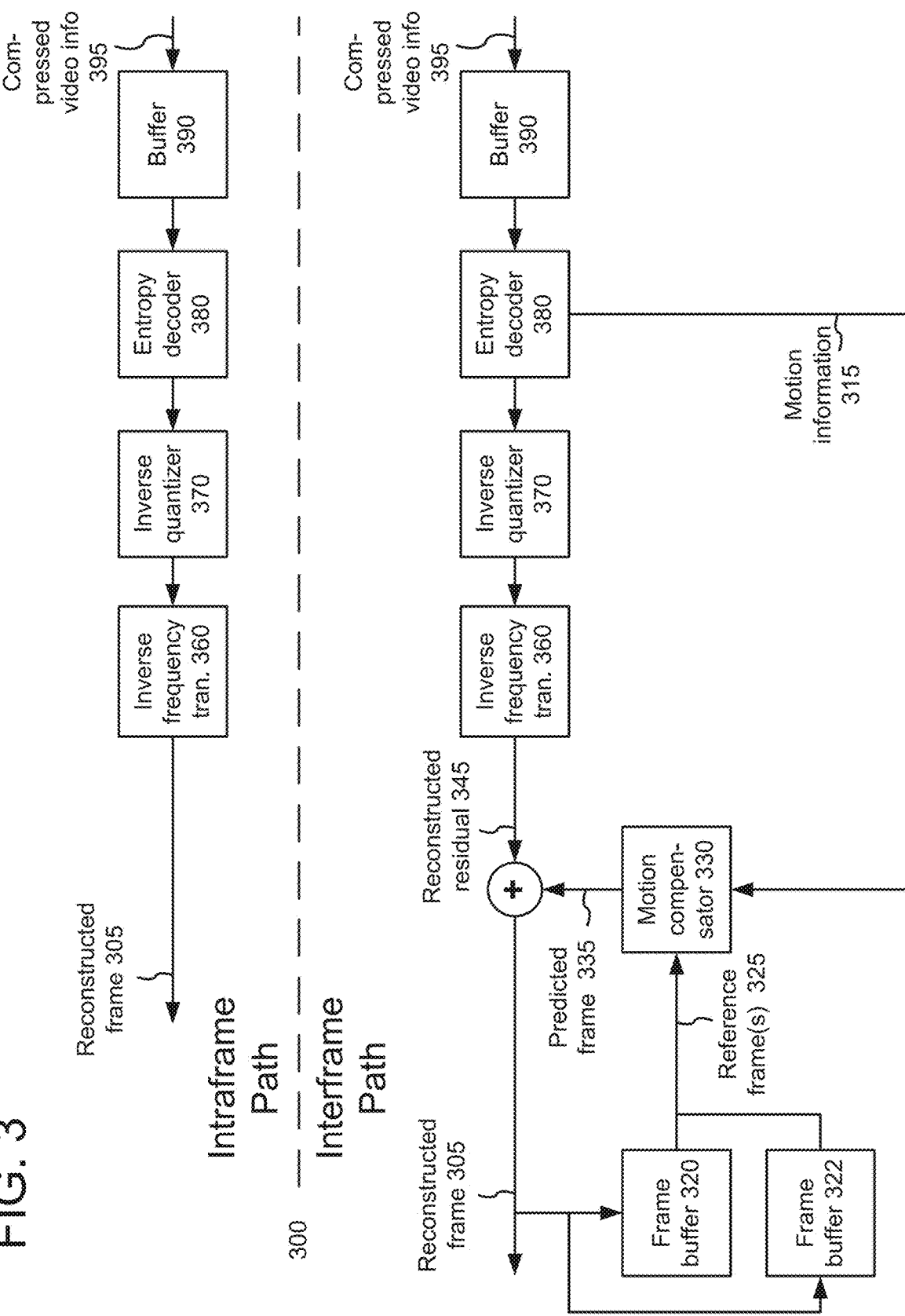
FIG. 3 is a schematic block diagram of a generalized decoder in which embodiments of the disclosed deblocking techniques can be used.

The deblocking techniques described herein can be incorporated into embodiments of a video encoder and/or decoder. For example, in certain implementations, the deblocking filter techniques are used in connection with an encoder and/or decoder implementing the H.264 AVC standard or H.264 HEVC standard. In alternative embodiments, the deblocking techniques described herein are implemented independently or in combination in the context of other digital signal compression systems, and other video codec standards. FIGS. 2-5 below illustrate the general operation of an example encoder and decoder (such as an H.264/AVC encoder or decoder) in which embodiments of the disclosed technology can be used. In particular, FIG. 2 is a block diagram of a generalized video encoder system 200, and FIG. 3 is a block diagram of a generalized video decoder system 300. The relationships shown between modules within the encoder and the decoder indicate the main flow of information in the encoder and decoder; other relationships are not shown for the sake of simplicity. FIGS. 2 and 3 generally do not show side information indicating the encoder settings, modes, tables, etc. used for a video sequence, frame, macroblock, block, etc. Such side information is sent in the output bit stream, typically after the information is entropy encoded. The format of the output bit stream can be a H.264 format or another format.

The encoder system 200 and decoder system 300 are block-based and support a 4:2:0 macroblock format with each macroblock including four 8×8 luminance blocks (at times treated as one 16×16 macroblock) and two 8×8 chrominance blocks. Alternatively, the encoder 200 and decoder 300 are object-based, use a different macroblock or block format, or perform operations on sets of pixels of different sizes or configurations than 8×8 blocks and 16×16 macroblocks.

Depending on the implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

1. Video Encoder

FIG. 2 is a block diagram of a general video encoder system 200. The encoder system 200 receives a sequence of video frames including a current frame 205, and produces compressed video information 295 as output. Particular embodiments of video encoders typically use a variation or supplemented version of the generalized encoder system 200.

The encoder system 200 compresses predicted frames and key frames. For the sake of presentation, FIG. 2 shows a path for key frames through the encoder system 200 and a path for predicted frames. Many of the components of the encoder system 200 are used for compressing both key frames and predicted frames. The exact operations performed by those components can vary depending on the type of information being compressed.

A predicted frame (also called a "P-frame," "B-frame," or "inter-coded frame") is represented in terms of a prediction (or difference) from one or more reference (or anchor) frames. A prediction residual is the difference between what was predicted and the original frame. In contrast, a key frame (also called an "I-frame," or "intra-coded frame") is compressed without reference to other frames. Other frames also can be compressed without reference to other frames. For example, an intra B-frame (or "B/I-frame"), while not a true key frame, is also compressed without reference to other frames.

If the current frame 205 is a forward-predicted frame, a motion estimator 210 estimates motion of macroblocks or other sets of pixels of the current frame 205 with respect to a reference frame, which is the reconstructed previous frame 225 buffered in a frame store (e.g., frame store 220). If the current frame 205 is a bi-directionally-predicted frame (a B-frame), a motion estimator 210 estimates motion in the current frame 205 with respect to two reconstructed reference frames. Typically, a motion estimator estimates motion in a B-frame with respect to a temporally previous reference frame and a temporally future reference frame. Accordingly, the encoder system 200 can comprise separate stores 220 and 222 for backward and forward reference frames. The motion estimator 210 can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator 210 outputs as side information motion information 215, such as motion vectors. A motion compensator 230 applies the motion information 215 to the reconstructed frame(s) 225 to form a motion-compensated current frame 235. The prediction is rarely perfect, however, and the difference between the motion-compensated current frame 235 and the original current frame 205 is the prediction residual 245. Alternatively, a motion estimator and motion compensator apply another type of motion estimation/compensation. A frequency transformer 260 converts the spatial domain video information into frequency domain (spectral) data. For block-based video frames, the frequency transformer 260 applies a discrete cosine transform ("DCT") or variant of DCT to blocks of the pixel data or the prediction residual data, producing blocks of DCT coefficients. Alternatively, the frequency transformer 260 applies another conventional frequency transform such as a Fourier transform or uses wavelet or subband analysis. If the encoder uses spatial extrapolation (not shown in FIG. 2) to encode blocks of key frames, the frequency transformer 260 can apply a re-oriented frequency transform such as a skewed DCT to blocks of prediction residuals for the key frame. In some embodiments, the frequency transformer 260 applies an 8×8, 8×4, 4×8, or other size frequency transform (e.g., DCT) to prediction residuals for predicted frames. A quantizer 270 then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder system 200 can use frame dropping, adaptive filtering, or other techniques for rate control.

If a given macroblock in a predicted frame has no information of certain types (e.g., no motion information for the macroblock and no residual information), the encoders 200 may encode the macroblock as a skipped macroblock. If so, the encoder signals the skipped macroblock in the output bit stream of compressed video information 295.

When a reconstructed current frame is needed for subsequent motion estimation/compensation, an inverse quantizer 276 performs inverse quantization on the quantized spectral data coefficients. An inverse frequency transformer 266 then performs the inverse of the operations of the frequency transformer 260, producing a reconstructed prediction residual (for a predicted frame) or a reconstructed key frame. If the current frame 205 was a key frame, the reconstructed key frame is taken as the reconstructed current frame (not shown). If the current frame 205 was a predicted frame, the reconstructed prediction residual is added to the motion-compensated current frame 235 to form the reconstructed current frame. A frame store (e.g., frame store 220) buffers the reconstructed current frame for use in predicting another frame. In some embodiments, the encoder applies a deblocking process to the reconstructed frame to adaptively smooth discontinuities in the blocks of the frame. For instance, the encoder can apply any of the deblocking techniques disclosed herein to the reconstructed frame.

The entropy coder 280 compresses the output of the quantizer 270 as well as certain side information (e.g., motion information 215, spatial extrapolation modes, quantization step size). Typical entropy coding techniques include arithmetic coding, differential coding, Huffman coding, run length coding, LZ coding, dictionary coding, and combinations of the above. The entropy coder 280 typically uses different coding techniques for different kinds of information (e.g., DC coefficients, AC coefficients, and different kinds of side information), and can choose from among multiple code tables within a particular coding technique.

The entropy coder 280 puts compressed video information 295 in the buffer 290. A buffer level indicator is fed back to bit rate adaptive modules. The compressed video information 295 is depleted from the buffer 290 at a constant or relatively constant bit rate and stored for subsequent streaming at that bit rate. Therefore, the level of the buffer 290 is primarily a function of the entropy of the filtered, quantized video information, which affects the efficiency of the entropy coding. Alternatively, the encoder system 200 streams compressed video information immediately following compression, and the level of the buffer 290 also depends on the rate at which information is depleted from the buffer 290 for transmission.

Before or after the buffer 290, the compressed video information 295 can be channel coded for transmission over the network. The channel coding can apply error detection and correction data to the compressed video information 295.

2. Video Decoder

FIG. 3 is a block diagram of a general video decoder system 300. The decoder system 300 receives information 395 for a compressed sequence of video frames and produces output including a reconstructed frame 305. Particular embodiments of video decoders typically use a variation or supplemented version of the generalized decoder 300.

The decoder system 300 decompresses predicted frames and key frames. For the sake of presentation, FIG. 3 shows a path for key frames through the decoder system 300 and a path for predicted frames. Many of the components of the decoder system 300 are used for decompressing both key frames and predicted frames. The exact operations performed by those components can vary depending on the type of information being decompressed.

A buffer 390 receives the information 395 for the compressed video sequence and makes the received information available to the entropy decoder 380. The buffer 390 typically receives the information at a rate that is fairly constant over time, and includes a jitter buffer to smooth short-term variations in bandwidth or transmission. The buffer 390 can include a playback buffer and other buffers as well. Alternatively, the buffer 390 receives information at a varying rate. Before or after the buffer 390, the compressed video information can be channel decoded and processed for error detection and correction.

The entropy decoder 380 entropy decodes entropy-coded quantized data as well as entropy-coded side information (e.g., motion information 315, spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 380 frequently uses different decoding techniques for different kinds of information (e.g., DC coefficients, AC coefficients, and different kinds of side information), and can choose from among multiple code tables within a particular decoding technique.

A motion compensator 330 applies motion information 315 to one or more reference frames 325 to form a prediction 335 of the frame 305 being reconstructed. For example, the motion compensator 330 uses a macroblock motion vector to find a macroblock in a reference frame 325. A frame buffer (e.g., frame buffer 320) stores previously reconstructed frames for use as reference frames. Typically, B-frames have more than one reference frame (e.g., a temporally previous reference frame and a temporally future reference frame). Accordingly, the decoder system 300 can comprise separate frame buffers 320 and 322 for backward and forward reference frames. The motion compensator 330 can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder 300 also reconstructs prediction residuals. When the decoder needs a reconstructed frame for subsequent motion compensation, a frame buffer (e.g., frame buffer 320) buffers the reconstructed frame for use in predicting another frame. In some embodiments, the decoder applies a deblocking process to the reconstructed frame to adaptively smooth discontinuities in the blocks of the frame. For instance, the decoder can apply any of the deblocking techniques disclosed herein to the reconstructed frame.

An inverse quantizer 370 inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 360 converts the quantized, frequency domain data into spatial domain video information. For block-based video frames, the inverse frequency transformer 360 applies an inverse DCT ("IDCT") or variant of IDCT to blocks of the DCT coefficients, producing pixel data or prediction residual data for key frames or predicted frames, respectively. Alternatively, the frequency transformer 360 applies another conventional inverse frequency transform such as a Fourier transform or uses wavelet or subband synthesis. If the decoder uses spatial extrapolation (not shown in FIG. 3) to decode blocks of key frames, the inverse frequency transformer 360 can apply a re-oriented inverse frequency transform such as a skewed IDCT to blocks of prediction residuals for the key frame. In some embodiments, the inverse frequency transformer 360 applies an 8×8, 8×4, 4×8, or other size inverse frequency transforms (e.g., IDCT) to prediction residuals for predicted frames.

When a skipped macroblock is signaled in the bit stream of information 395 for a compressed sequence of video frames, the decoder 300 reconstructs the skipped macroblock without using the information (e.g., motion information and/or residual information) normally included in the bit stream for non-skipped macroblocks.

C. Loop Filtering

Quantization and other lossy processing of prediction residuals can cause block artifacts (artifacts at block boundaries) in reference frames that are used for motion estimation of subsequent predicted frames. Post-processing by a decoder to remove blocky artifacts after reconstruction of a video sequence improves perceptual quality. However, post-processing does not improve motion compensation using the reconstructed frames as reference frames and does not improve compression efficiency. With or without post-processing, the same amount of bits is used for compression. Moreover, the filters used for deblocking in post-processing can introduce too much smoothing in reference frames used for motion estimation/compensation.

In embodiments of the disclosed technology, a video encoder processes a reconstructed frame to reduce blocky artifacts prior to motion estimation using the reference frame. Additionally, in embodiments of the disclosed technology, a video decoder processes the reconstructed frame to reduce blocky artifacts prior to motion compensation using the reference frame. With deblocking, a reference frame becomes a better reference candidate to encode the following frame. Thus, using embodiments of the disclosed deblocking techniques can improve the quality of motion estimation/compensation, resulting in better prediction and lower bit rate for prediction residuals. The deblocking processes described herein are especially helpful in low bit rate applications.

In some embodiments, following the reconstruction of a frame in a video encoder or decoder, the encoder/decoder applies a deblocking technique to blocks in the reconstructed frame. The deblocking technique can include, for example, applying a directional deblocking or smoothing filter to blocks in the reconstructed frame. For instance, the encoder/decoder can apply the deblocking filter across boundary rows and/or columns of a selected block. The deblocking filter can remove boundary discontinuities between blocks in the reconstructed frame while preserving real edges in the video image, when appropriate, thereby improving the quality of subsequent motion estimation using the reconstructed frame as a reference frame. In certain embodiments, the encoder/decoder performs deblocking after reconstructing the frame in a motion compensation loop in order for motion compensation to work as expected. This contrasts with typical post-processing deblocking processes, which operate on the whole image outside of the motion compensation loop. Further, a decoder can apply an additional post-processing deblocking filter to further smooth a reconstructed frame for playback after applying any of the disclosed deblocking techniques to a reference frame during motion compensation.

Figure 4:
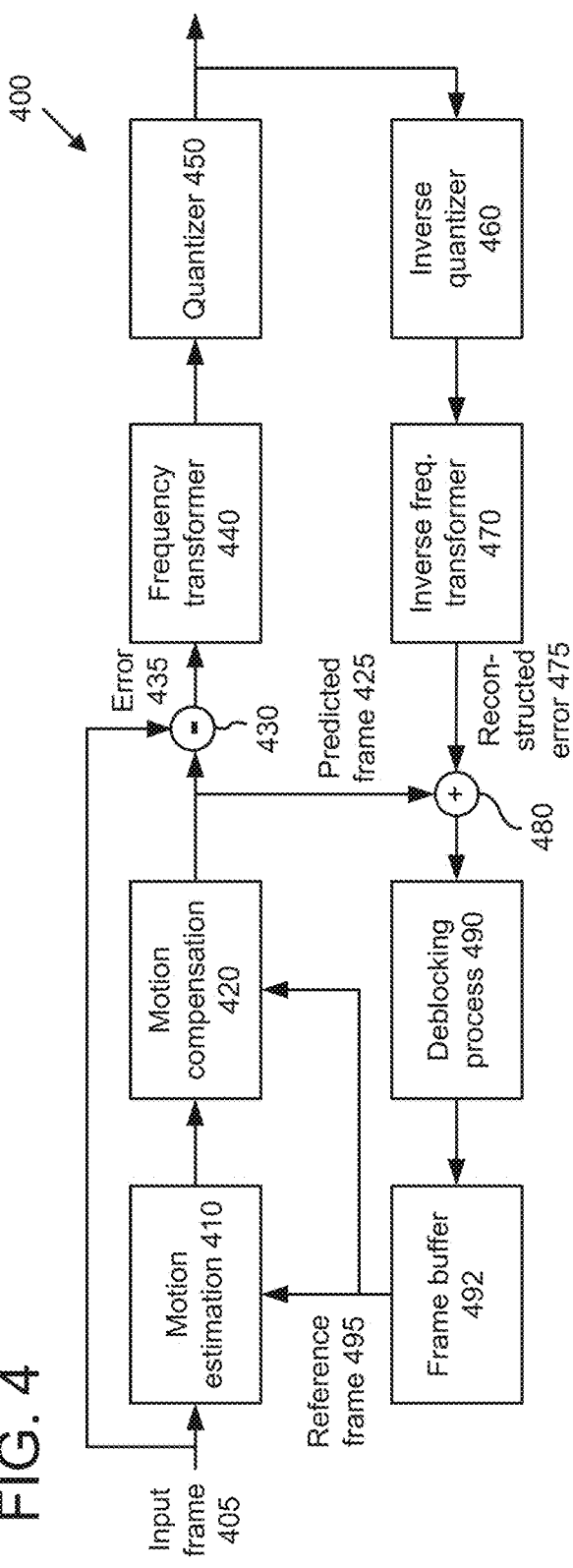
FIG. 4 is a schematic block diagram of a motion estimation/compensation loop in an encoder in which embodiments of the disclosed deblocking techniques can be used.
Figure 5:
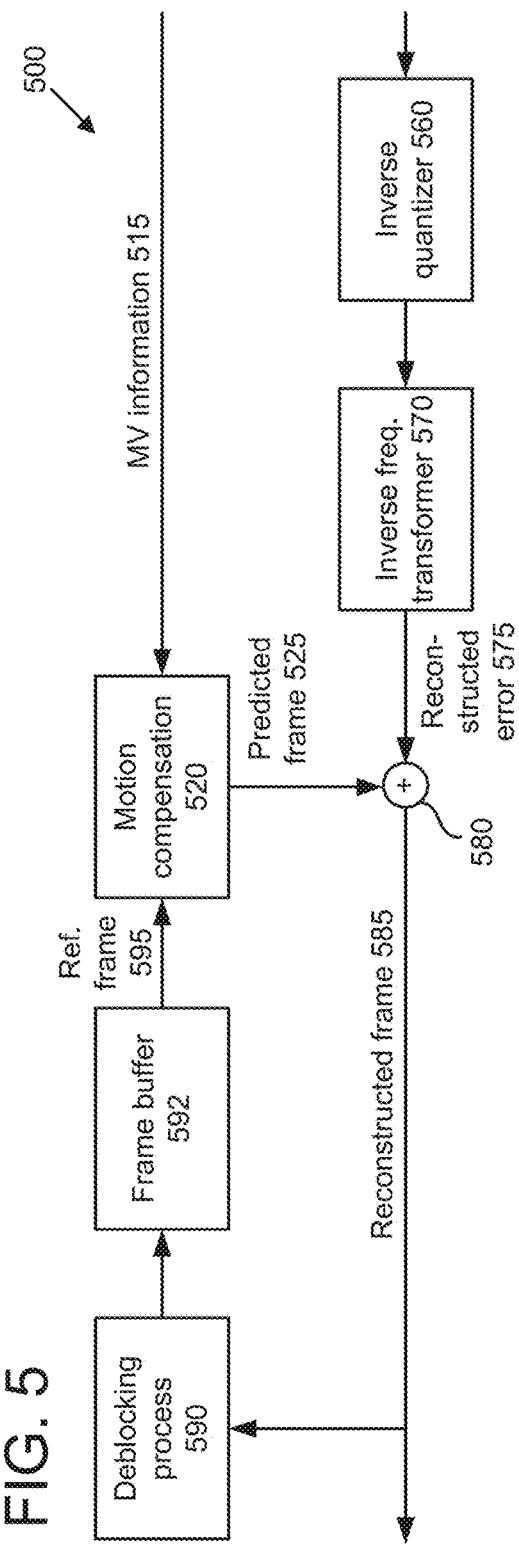
FIG. 5 is a schematic block diagram of a motion compensation loop in a decoder in which embodiments of the disclosed deblocking techniques can be used.

FIG. 4 shows a motion estimation/compensation loop in a video encoder that includes a deblocking process. FIG. 5 shows a corresponding motion compensation loop in a video decoder that includes a deblocking process. The deblocking process can comprise any of the deblocking processes disclosed herein and described in more detail below (e.g., any of the content-adaptive directional deblocking techniques disclosed herein).

With reference to FIG. 4, a motion estimation/compensation loop 400 includes motion estimation 410 and motion compensation 420 of an input frame 405. The motion estimation 410 finds motion information for the input frame 405 with respect to a reference frame 495, which is typically a previously reconstructed intra- or inter-coded frame. In alternative embodiments, the loop filter is applied to backward-predicted or bi-directionally-predicted frames. The motion estimation 410 produces motion information such as a set of motion vectors for the frame. The motion compensation 420 applies the motion information to the reference frame 495 to produce a predicted frame 425.

The prediction is rarely perfect, so the encoder computes 430 the error/prediction residual 435 as the difference between the original input frame 405 and the predicted frame 425. The frequency transformer 440 frequency transforms the prediction residual 435, and the quantizer 450 quantizes the frequency coefficients for the prediction residual 435 before passing them to downstream components of the encoder.

In the motion estimation/compensation loop, the inverse quantizer 460 inverse quantizes the frequency coefficients of the prediction residual 435, and the inverse frequency transformer 470 changes the prediction residual 435 back to the spatial domain, producing a reconstructed error 475 for the frame 405.

The encoder then combines 480 the reconstructed error 475 with the predicted frame 425 to produce a reconstructed frame. The encoder applies a deblocking process 490 (e.g., a deblocking process according to any of the disclosed embodiments) to the reconstructed frame and stores the reconstructed frame in a frame buffer 492 for use as a reference frame 495 for the next input frame. Alternatively, the deblocking process 490 follows the frame buffer 492. In alternative embodiments, the arrangement or constituents of the motion estimation/compensation loop changes, but the encoder still applies the deblocking process to reference frames.

With reference to FIG. 5, a motion compensation loop 500 includes motion compensation 520 to produce a reconstructed frame 585. The decoder receives motion information 515 from the encoder. The motion compensation 520 applies the motion information 515 to a reference frame 595 to produce a predicted frame 525.

In a separate path, the inverse quantizer 560 inverse quantizes the frequency coefficients of a prediction residual, and the inverse frequency transformer 570 changes the prediction residual back to the spatial domain, producing a reconstructed error 575 for the frame 585.

The decoder then combines 580 the reconstructed error 575 with the predicted frame 525 to produce the reconstructed frame 585, which is output from the decoder. The decoder also applies a deblocking process 590 (e.g., a deblocking process according to any of the disclosed embodiments) to the reconstructed frame 585 and stores the reconstructed frame in a frame buffer 592 for use as the reference frame 595 for the next input frame. Alternatively, the loop filter 590 follows the frame buffer 592. In alternative embodiments, the arrangement or constituents of the motion compensation loop changes, but the decoder still applies the deblocking process to reference frames.

In the video encoder 200/decoder 300, the compressed bitstream does not need to provide any indication whether out-of-loop deblocking should be employed. The latter is usually determined by the decoder 300 based on simple rules and the availability of additional computing cycles. Signals may be provided by the encoder in the bitstream indicating whether to use post-processing. On the other hand, the application of in-loop deblocking is typically indicated within the bitstream to avoid drift or mismatch. This indication may be through a sequence based flag, or possibly using frame or sub-frame based flags. A decoder that encounters a frame indicating that it has been in-loop deblocked will in turn decode and deblock that frame for bitstream compliance.

II. Exemplary Content-Adaptive Deblocking Techniques

A. A Generalized Content-Adaptive Deblocking Process

Figure 6:
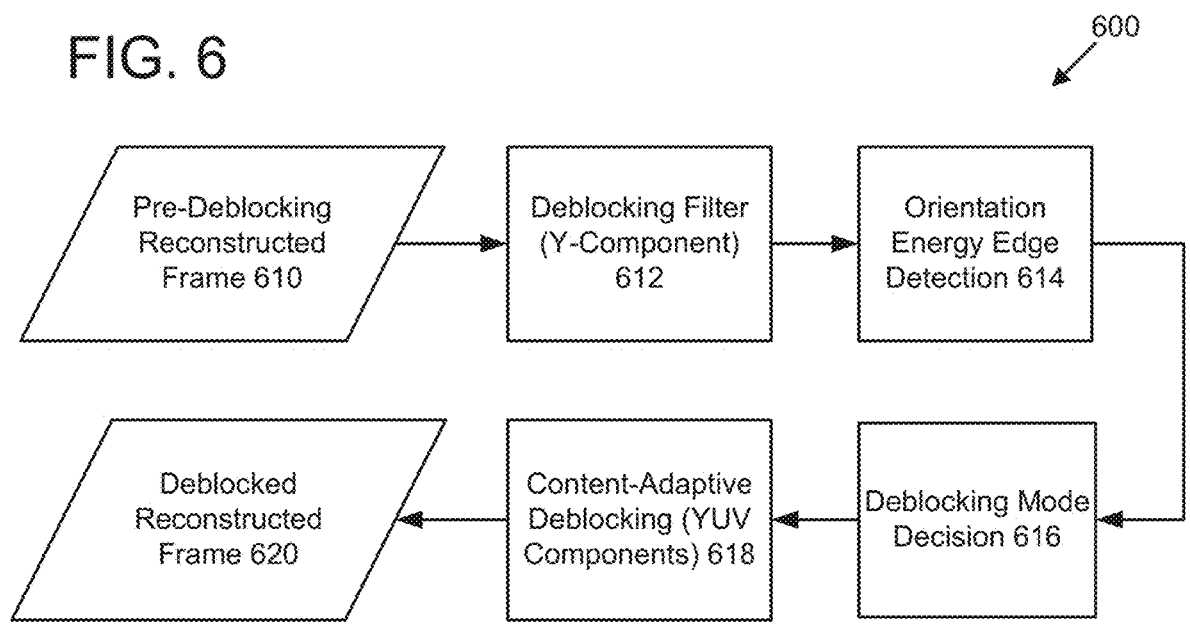
FIG. 6 is a schematic block diagram of a general exemplary embodiment of a deblocking process according to the disclosed technology.

FIG. 6 is a block diagram showing an exemplary embodiment of a generalized deblocking process 600 in accordance with the disclosed technology. The illustrated deblocking process can be employed in a motion estimation/compensation loop of an encoder or decoder (e.g., as the deblocking process 490 shown in FIG. 4, or the deblocking process 590 shown in FIG. 5). In certain embodiments, only intra-coded frames (I-frames or key frames) are deblocked using the deblocking process 600. In other embodiments, however, inter-coded frames or both intra- and inter-coded frames are deblocked using the deblocking process 600.

The exemplary deblocking process 600 is performed on a reconstructed frame 610. The reconstructed frame can be a decoded frame after inverse DCT and motion compensation. At 612, the luminance components of the reconstructed frame 610 are processed with a deblocking filter (e.g., an H.264/AVC deblocking filter). In other embodiments, however, this initial deblocking act is absent. At 614, orientation energy edge detection ("OEED") is performed on at least a portion of the initially deblocked frame. In some embodiments, for instance, global OEED is conducted on the initially deblocked image. As more fully explained below, global OEED can be used to detect the edges in the initially deblocked frame, thereby partitioning the image into local directional features ("LDFs"). For example, OEED can also be used to identify the edge orientations of the LDFs in the image. At 616, a deblocking mode is determined for each block in the frame. In particular embodiments, and as more fully explained below, the deblocking mode decision can be based at least in part on the LDF edge detection and edge orientation of the LDF in a given block. Based at least in part on the results of the OEED, different deblocking modes can be decided for blocks in the frame (e.g., each of the blocks in the frame). At 618, content-adaptive deblocking is performed on both the luminance and chroma components of the decoded frame. The deblocking can be performed for the blocks using the deblocking modes determined at 616. For example, in certain embodiments, the deblocking filter orientations and activation thresholds can be based at least in part on the deblocking mode decisions from 616. At 620, the deblocked reconstructed frame is generated. As noted above, the reconstructed frame can be used as a reference frame for further motion compensation/estimation. However, because the deblocking scheme 600 has smoothed or appropriately filtered the directional LDFs at the block boundaries of the reconstructed frame, undesirable and visually annoying block artifacts can be removed or substantially removed from the reconstructed frame.

B. Orientation Energy Edge Detection

In embodiments of the disclosed technology, an image is partitioned into LDFs using an orientation energy edge detection ("OEED") technique. OEED can be used to extract edges and edge orientations. For example, edges can be extracted by orientation energy on an initially deblocked luminance image I. To implement OEED, sets of one or more Gaussian derivative filters can be used, where each set of filters is oriented along a different orientation. In particular embodiments of the disclosed technology, the OEED filters are defined as follows:

$$W(x,y,\theta) = (F_\theta^o * I)^2 + (F_\theta^e * I)^2 \tag{1}$$

where $F_\theta^o$ and $F_\theta^e$ are the first and second Gaussian derivative filters, respectively, at orientation $\theta$.

Figure 8:
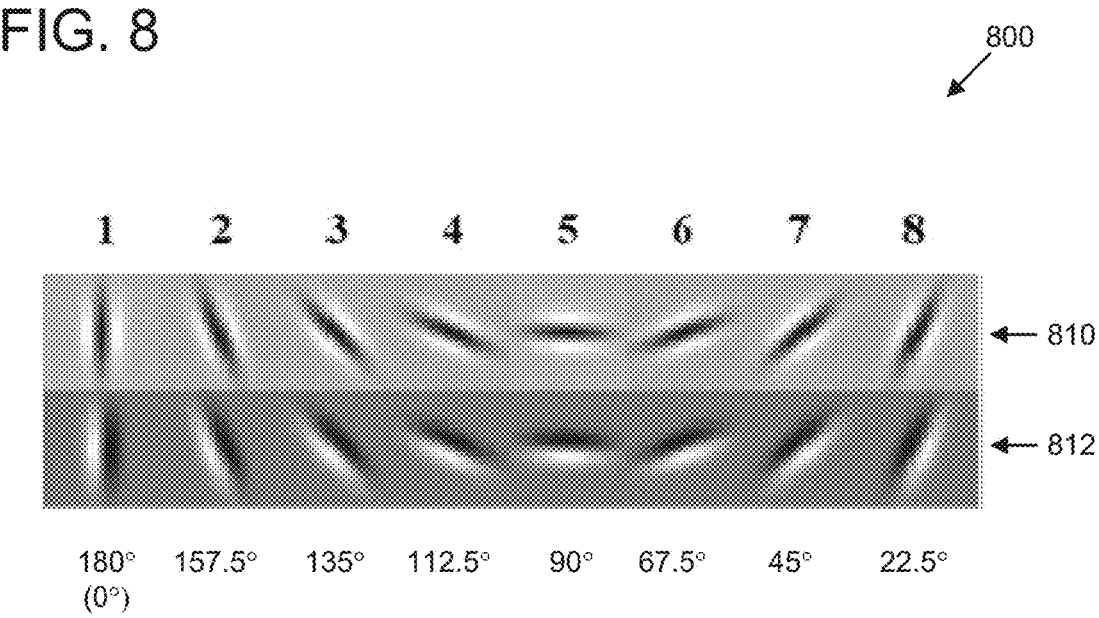
FIG. 8 is a diagram showing eight orientation energy edge detection ("OEED") filters as can be used with embodiments of the disclosed technology.

In one desirable embodiment, eight sets of filters are used. FIG. 8 is a block diagram 800 showing eight sets of two filters each, where each set includes orientation energy filters having a different orientation than the filters of the other sets. In particular, each set includes a first Gaussian derivative filter (shown at row 810) and a second Gaussian derivative filter (shown at row 812). In the illustrated embodiment, the filters have orientations of 180° (which can also be viewed as 0°), 157.5°, 135°, 112.5°, 90°, 67.5°, 45°, and 22.5°. In particular embodiments, the first and second Gaussian derivative filters at orientation $\theta$ have the following form:

$$F^o(x, y, \theta) = \frac{1}{2\pi\sigma_x\sigma_y} \cdot \frac{\hat{x}^2 - 1}{\sigma_x^2} \exp\left\{-\frac{1}{2}\left(\frac{\hat{x}^2}{\sigma_x^2} + \frac{\hat{y}^2}{\sigma_y^2}\right)\right\} \tag{2}$$

$$F^e(x, y, \theta) = \frac{1}{2\pi\sigma_x\sigma_y} \cdot \frac{-\hat{x}}{\sigma_x^2} \exp\left\{-\frac{1}{2}\left(\frac{\hat{x}^2}{\sigma_x^2} + \frac{\hat{y}^2}{\sigma_y^2}\right)\right\}$$

$$\hat{x} = x\cos\theta - y\sin\theta$$

$$\hat{y} = x\sin\theta + y\cos\theta$$

where $\sigma_x$ and $\sigma_y$ are filter parameters that can vary from implementation to implementation. In certain implementations of these embodiments, the length and taps of the filter are further defined as:

$$T = \lfloor \max(\sigma_x, \sigma_y) \cdot A + 0.5 \rfloor \tag{3}$$

$$x, y \in \left[-\frac{T}{2}, \frac{T}{2}\right]$$

where A is a parameter that can vary from implementation to implementation. Furthermore, the angle discretization used for the filters can vary from implementation to implementation. In one implementation, however, the angle discretization is:

$$\theta = \frac{2\pi n}{N}, \quad n = 0, \ldots, N/2 - 1 \tag{4}$$

The value of N can also vary from implementation to implementation. In one particular implementation, the values of $\sigma_x$, $\sigma_y$, A, and N are as follows:
$\sigma_x$=1.3,
$\sigma_y$=3.9,
A=4.2426,
N=16

For each pixel (x, y) in I, and with reference to OEED filters having the form shown in Expression (1), the filter output energy W will have a maximum at an orientation parallel to an edge, and an energy maximum along a line perpendicular to the edge. Therefore, and according to one embodiment, edges can be found by marking or otherwise designating pixels in the image I (e.g., each pixel throughout a plurality of blocks, such as each pixel throughout all blocks of the image) that satisfy:

$$\frac{\partial}{\partial \theta} W(p) = 0, \frac{\partial}{\partial v_\theta} W(p) = 0 \tag{5}$$

where $v_\theta$ is the unit vector orthogonal to $\theta$. Edges can also be found by marking pixels where Expression (5) is near zero or approximately zero (e.g., within a deviation of zero computed to accommodate the angular discretization between the OEED filters). Furthermore, as a result of finding the edges using the OEED filters, the orientations of the edges will also be known. In particular, the orientation of the OEED filter that causes Expression (5) (or similar expression) to be satisfied corresponds to the orientation of the edge pixel being evaluated.

Figure 9:
FIG. 9 shows an exemplary reconstructed image that may be input into embodiments of the disclosed deblocking processes, such as the deblocking process of FIG. 7.
Figure 10:
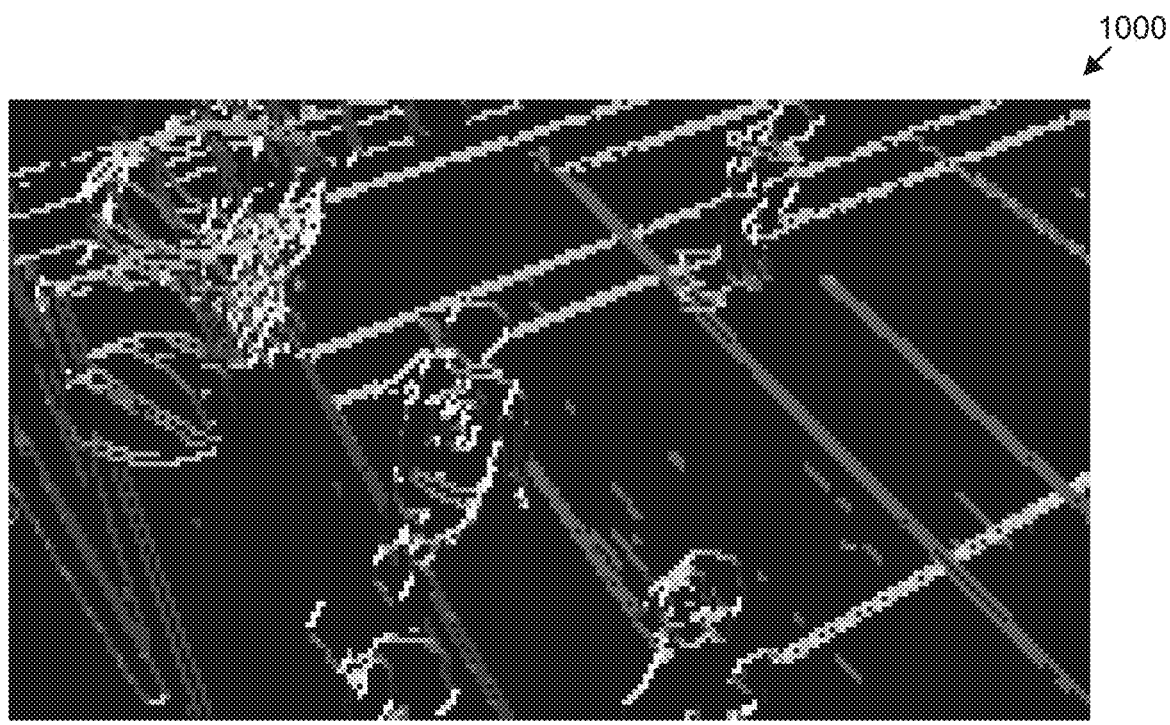
FIG. 10 shows an exemplary local directional feature ("LDF") partition of the image of FIG. 9 obtained using an embodiment of the disclosed OEED techniques.
Figure 11:
FIG. 11 shows an exemplary edge map of the image of FIG. 9 obtained using an embodiment of the disclosed OEED techniques.
Figure 12:
FIG. 12 shows an exemplary angle map of the image of FIG. 9 obtained using an embodiment of the disclosed OEED techniques.

By using OEED, an edge map recording edge pixel locations can be created. Additionally, by using OEED, an angle map (or orientation map) recording the orientation of each pixel can also be created. For instance, FIGS. 9, 10, 11, and 12 illustrate exemplary LDF partitions, edge maps, and angle maps that can be created using OEED. In particular, FIG. 9 shows an example of a reconstructed image 900 that may be input into a deblocking process, such as the deblocking process 600. FIG. 10 shows an LDF partition 1000 of the image 900 obtained using an embodiment of the OEED described herein. In particular, the exemplary LDF partition 1000 is a block-level LDF partition where blocks are shown in white if they contain an edge as detected according to a corresponding edge map obtained from an embodiment of OEED. For example, FIG. 11 shows an edge map 1100 of the image 900 obtained from an embodiment of OEED using Expressions (1) and (5). In FIG. 11 edge pixels satisfying Expression (5) are marked white. FIG. 12 shows an angle map 1200 obtained using OEED. In FIG. 12, different intensities indicate different orientations.

Figure 21:
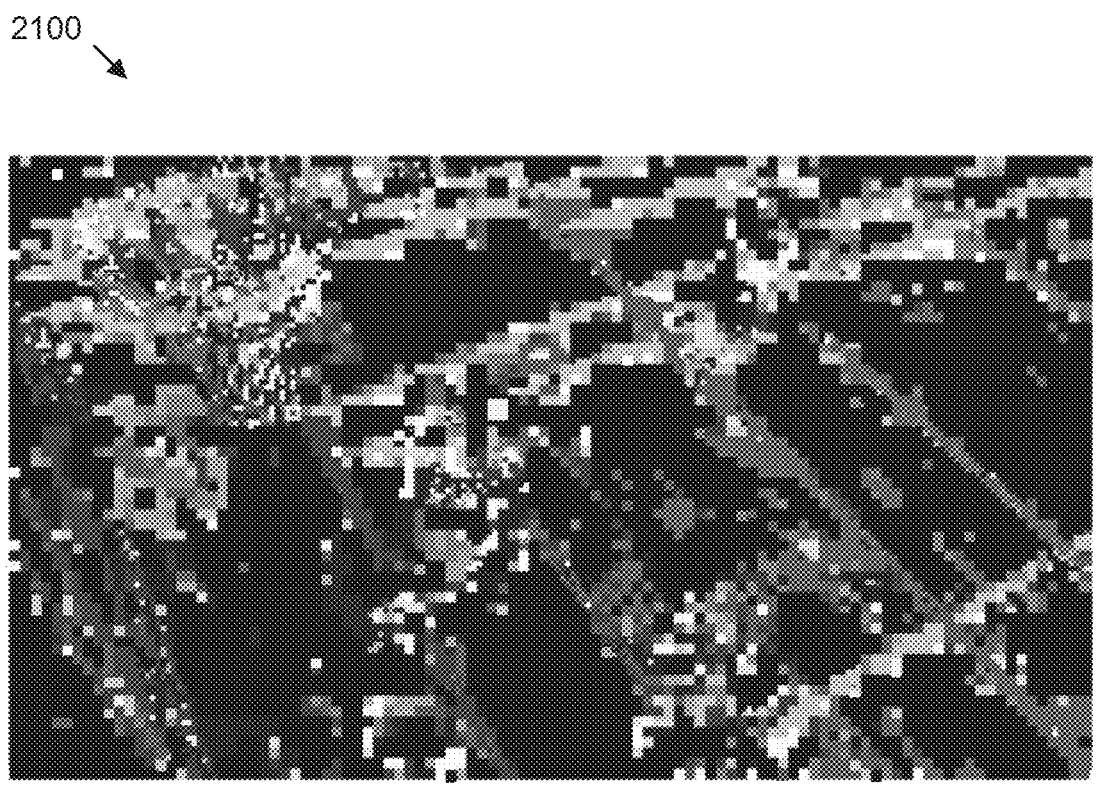
FIG. 21 shows an exemplary LDF partition of the image of FIG. 9 obtained using an intra prediction technique.

FIG. 21 shows an LDF partition 2100 of the image 900 obtained from the intra prediction mode as described in J. Jeong et al., "A directional deblocking filter based on intra prediction for H.264/AVC," IEICE Electronics Express, vol. 6, no. 12, pp. 864-869 (June 2009) (hereinafter "Jeong"). As can be seen by comparing the LDF partition 1000 in FIG. 10 to the LDF partition 2100 in FIG. 21, OEED is more accurate than intra prediction in distinguishing LDFs, even at a low bit rate.

Compared with edge detection techniques using only image gradients, OEED can jointly consider edge location and orientation. In addition, OEED utilizes a class of non-linear filters which are more appropriate for localizing composite edges, so it is able to provide more reliable information to distinguish LDF regions. As shown in block diagram 600, an initial deblocking of the luminance components can be performed prior to OEED (e.g., using the H.264/AVC deblocking scheme). Such an initial deblocking technique can further improve the accuracy of the edge and angle maps obtained from OEED and from which certain parameters can be determined later in content-adaptive deblocking schemes.

C. Deblocking Mode Decision

In certain embodiments, one or more the LDF partition, the edge map, or the angle map resulting from OEED are used, at least in part, to select an appropriate deblocking mode for each block. Although the number of available deblocking modes can vary from implementation to implementation, one particular embodiment of the disclosed technology has eight deblocking modes: six directional deblocking modes (each having a directional deblocking filter with a different orientation), an extra smoothing mode, and a standard deblocking mode (which can comprise a deblocking technique used in a known standard, such as the H.264/AVC deblocking technique). Furthermore, in this embodiment, the six directional deblocking modes can comprise directional deblocking filters having orientations that correspond to orientations of the Gaussian derivative filters used during OEED and having modified activation thresholds. In one particular implementation, the six directional deblocking filters correspond to orientations 2, 3, 4, 6, 7, and 8 shown in FIG. 8 (the non-horizontal and non-vertical orientations). For example, the orientations can be 157.5°, 135°, 112.5°, 67.5°, 45°, and 22.5°.

To select which deblocking mode to use for a selected block (e.g., for each 4×4 or 8×8 transformed intra block), a variety of techniques can be used. In certain embodiments, for example, one of the directional deblocking modes is selected if the block is determined to have directional features that are consistent with one or more of its neighboring blocks. Metrics can be applied to the edge pixels of a selected block to evaluate the consistency of the edge orientations within the block. For example, an average orientation of the edge pixels in the selected block can be determined and used to evaluate edge orientation consistency. Additionally, an edge orientation deviation among the edge pixels in the block can be computed and also used to evaluate edge orientation consistency.

In certain embodiments, a deblocking mode decision is made for each transformed intra block $B_I$ with its upper and left neighbors $B_U$ and $B_L$ available. In one particular implementation, if edge pixels appear in $B_I$, an average orientation index $m_I$ is computed for the block. The average orientation index $m_I$ can be computed by averaging the orientations of edge pixels in the block $B_I$. The result can be rounded to be an integer value or can have some other resolution. In one exemplary implementation, the orientation values correspond to those shown in FIG. 8 and are integer values between 1 and 8. In certain implementations, an orientation variance value $ov_I$ is also computed for the edge pixels in the block $B_I$. The orientation variance value can be the statistical variance computed from the observed edge orientations. In other implementations, however, other measures of the deviations between the observed edge orientations can be used (e.g., the standard deviation, absolute deviation, or other such statistical metric).

Similar average orientation indices and orientation variances values can be computed for one or more of the neighboring blocks. For example, in one particular implementation, average orientation indices and orientation variances values are computed for the upper neighboring and the leftward neighboring block, resulting in $m_U$, $ov_U$, $m_L$, and $ov_L$. If there are no edge pixels in the one or more neighboring blocks, then the corresponding average orientations and orientation variances can be set to a fixed value (e.g., 0).

A distance metric can then be used to evaluate whether the average orientation indices of the selected block and the one or more neighboring block are indicative of edges having a consistent orientation. The orientation variance values for the selected block and the one or more neighboring blocks can also be evaluated. For example, in one particular implementation, a distance metric $D(m_a, m_b)$ between two different orientation indices is used. The distance metric can be the absolute value of the difference between the two average orientation indices and, in some embodiments, can be weighted. In one particular implementation, the following evaluation of the average orientation values and the orientation variance values is made:

$$D(m_I,m_U)+D(m_I,m_L)<T_1 \quad (6)$$

$$ov_I+ov_U+ov_L<T_2 \quad (7)$$

where $T_1$ and $T_2$ are threshold values that can be varied from implementation to implementation depending on the desired directional filter sensitivity. Furthermore, in certain embodiments, an evaluation using Expressions (6) and (7) is only performed if the orientation variance index for the selected block $B_I$ indicates that the orientation is non-vertical or non-horizontal (e.g., in embodiments in which the orientations correspond to FIG. 8, $m_I \neq 1,5$). Satisfaction of the Expressions (6) and (7) indicates that the current block $B_I$ has consistent directional features with its neighbors. Consequently, a directional deblocking mode using a directional deblocking filter having the appropriate orientation can be selected for block $B_I$. Such a directional deblocking filter can be used to reduce the blockiness of the block boundaries (e.g., at the boundaries of $m_I$, $m_U$, and $m_L$) while maintaining the existence of real edges along the detected orientation. As more fully explained below, an additional threshold evaluation can be performed before activating the deblocking filter. For example, the boundaries between the blocks can be evaluated to determine if the boundaries include "true" image edges that are desirably left unfiltered.

In certain embodiments, if edge pixels are not present in the selected block $B_I$, then the block can be evaluated to determine if the block is part of a region that is free of LDFs (a consecutive non-LDF region), in which case a smoothing filter can be applied. Blocking artifacts in consecutive non-LDF regions are among the most visually displeasing blocking artifacts because the true image intends for the region to have smoothly varying color or intensity gradations, whereas the compressed version often results in obvious color and intensity contrasts at the block borders. To determine whether the selected block $B_I$ is in a consecutive non-LDF region, a variety of metrics can be used. In certain embodiments, however, intensity variances can be evaluated between the selected block $B_I$ and one or more neighboring blocks. In other embodiments, chrominance variances can additionally or alternatively be evaluated.

In one particular implementation, for each block $B_I$ not having edge pixels with its upper and left neighbors $B_U$ and $B_L$ available, the intensity variances $iv_I$, $iv_U$ and $iv_L$ can be computed for the three blocks, respectively. The intensity variance value can be the statistical variance computed from the pixel intensities in each respective block. In other implementations, however, other measures of the deviations between the pixel intensities can be used (e.g., the standard deviation, absolute deviation, or other such statistical metric). The intensity variances can then be evaluated. In one particular implementation, the following evaluation of the intensity variances is made:

$$iv_I + iv_U + iv_L < T_3 \quad (8)$$

where $T_3$ is a threshold value that can be varied from implementation to implementation depending on the desired smoothing filter sensitivity. Satisfaction of the Expression (8) indicates that the current block $B_I$ is inside of a consecutive non-LDF region. Consequently, a deblocking mode using a smoothing filter is selected for block $B_I$. In certain implementations, the smoothing filter is applied with no further thresholds being evaluated. In other implementations, additional thresholds can be evaluated to determine whether to apply the smoothing filter.

In certain embodiments, if neither a directional deblocking or an extra smoothing mode is selected for a block $B_I$, then a standard deblocking mode can be applied (e.g., the h.264/AVC deblocking scheme). Additionally, the standard deblocking mode can be applied to blocks having horizontally or vertically oriented edges (e.g., in embodiments in which the orientations correspond to FIG. 8, $m_I \neq 1,5$).

Figure 13:
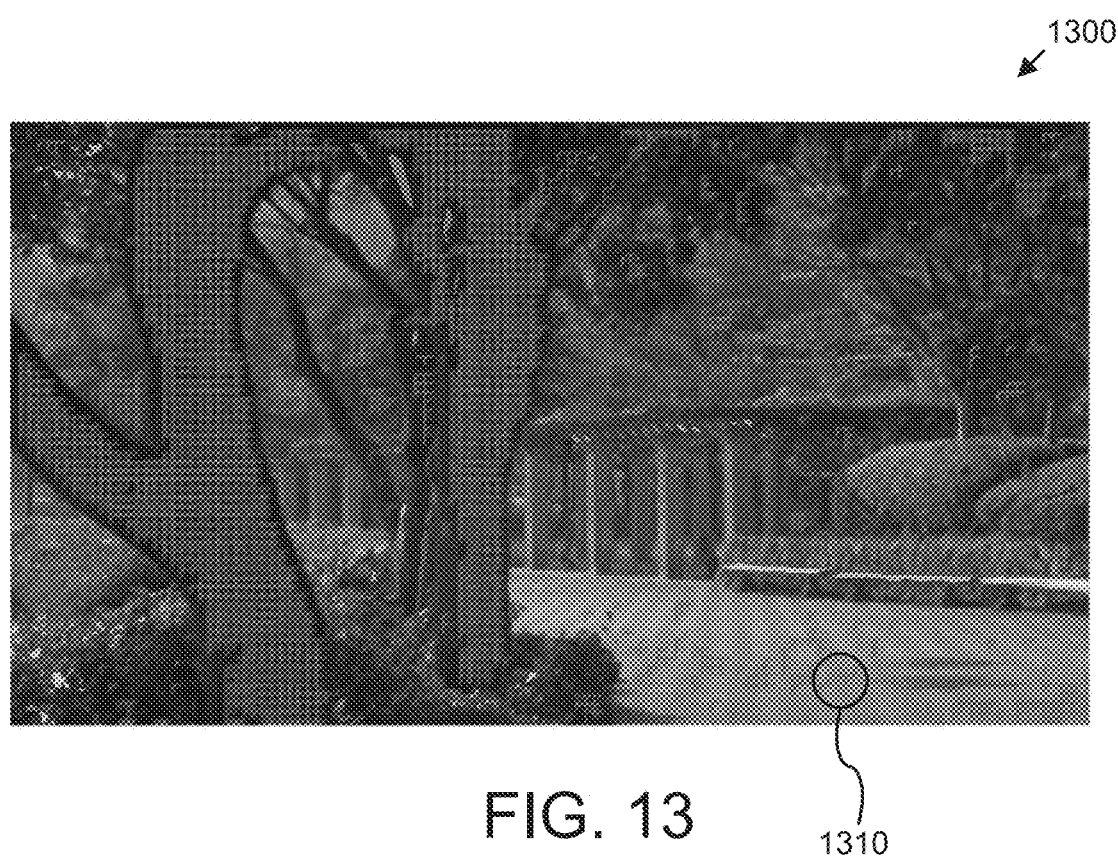
FIG. 13 shows an exemplary image highlighting non-LDF regions detected by an embodiment of the disclosed non-LDF region detection techniques.

FIG. 13 is an exemplary image 1300 showing blocks in consecutive non-LDF regions detected using an evaluation according to Expression (8). In particular, the blocks having highlighted upper and left borders (several of which are shown at 1310) are blocks determined to be in consecutive non-LDF regions. Accordingly, and in certain embodiments of the disclosed technology, a smoothing filter is selected for the highlighted blocks. FIG. 13 also illustrates that a single video frame can have a variety of content, creating different deblocking mode distributions throughout the image. The variety of image content further illustrates the desirability of a flexible deblocking scheme.

In some embodiments, the deblocking selection process can be affected by the block size being evaluated. For example, in one embodiment, only 4×4 and 8×8 blocks, which often contain image details, are evaluated to determine whether they have edge pixels present and whether a directional deblocking filter should be applied to the block. Furthermore, in certain embodiments, only 16×16 luminance blocks, which often contain smooth regions, are evaluated to determine whether they are part of a non-LDF region such that a smoothing filter should be applied. All other blocks in such embodiments can be deblocked using a standard deblocking process, such as the H.264/AVC deblocking process.

Once the deblocking mode decisions have been made, the selected deblocking filters can be applied to the video frame in a variety of manners. In one embodiment, for instance, the deblocking filters (including the directional deblocking filters and the smoothing filter) are applied in a raster-scan order at the macroblock level for both luminance and chroma components. In other embodiments, the deblocking filters are applied in different orders, such as in a box-out fashion, wipe fashion, by applying a selected filter to all of its corresponding blocks before applying a next selected filter, by applying the filters to non-LDF regions followed by LDF regions, or vice versa. In one particular implementation, once the deblocking mode decision is done, the 8 different deblocking filters are simultaneously employed in a raster-scan order at the macroblock level for both luminance and chroma components. The reconstructed frame is obtained in a single deblocking pass.

D. Exemplary Directional Deblocking Filters

Figure 14:
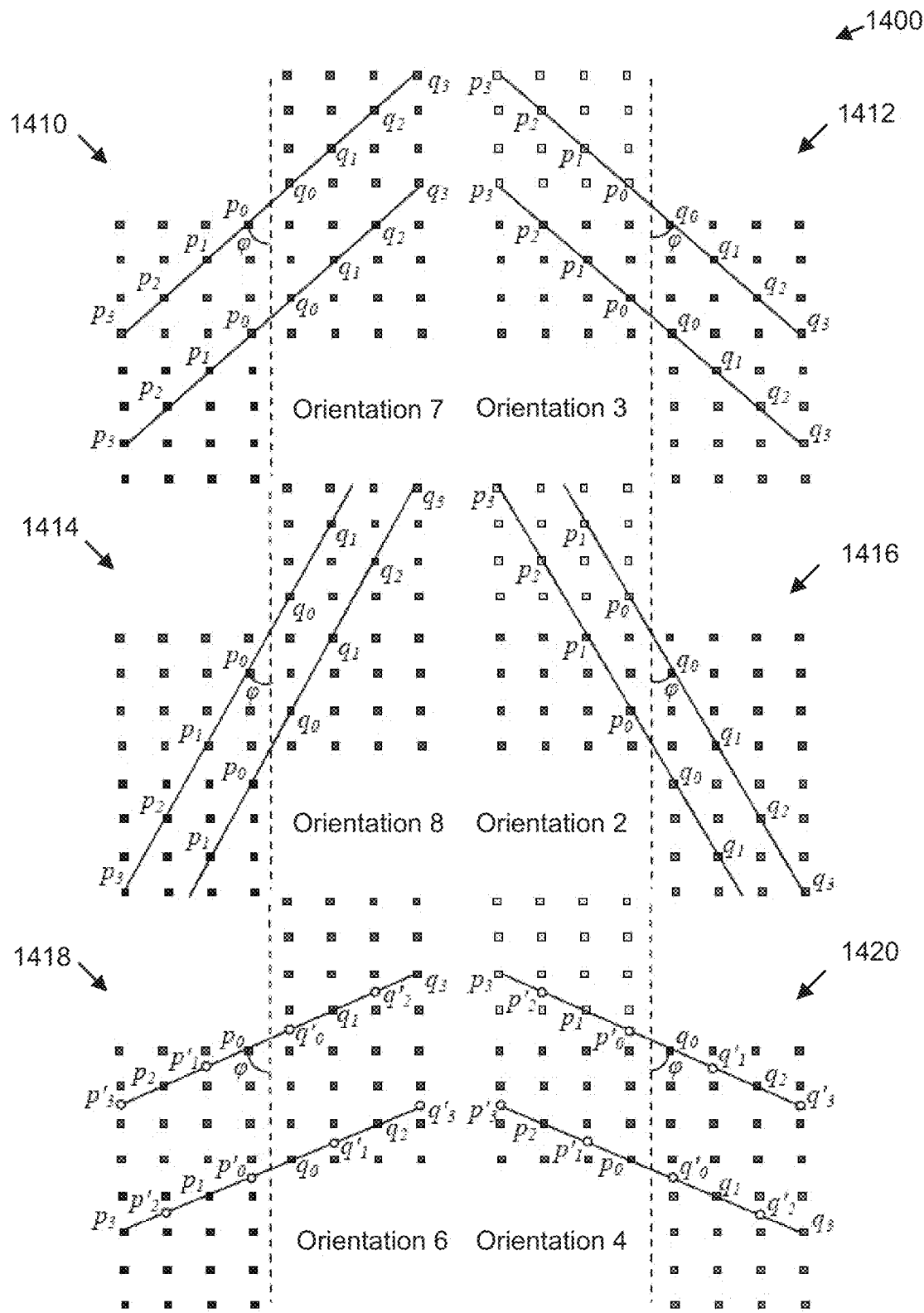
FIG. 14 is a schematic block diagram illustrating six exemplary directional deblocking filters that can be used with embodiments of the disclosed technology.

In certain embodiments, when a directional deblocking mode is selected, the filtering involves pixels that are no longer in a line perpendicular to the block boundary. For example, in one particular implementation, the filtering is along six different orientations corresponding to the orientations shown in FIG. 8. FIG. 14 is a block diagram 1400 illustrating examples of six filtering orientations across vertical block boundaries. Corresponding filter orientations can be used across horizontal block boundaries. In particular, FIG. 14 shows example filters from filter bank 1410 (related to orientation 7 from FIG. 8), filter bank 1412 (related to orientation 3 from FIG. 8), filter 1414 (related to orientation 8 from FIG. 8), filter bank 1416 (related to orientation 2 from FIG. 8), filter bank 1418 (related to orientation 6 from FIG. 8), and filter bank 1420 (related to orientation 4 from FIG. 8). In FIG. 14, and for ease of presentation, only selected pixels used by the filters are shown. The other pixels used with the filters can be easily determined by those of ordinary skill in the art based on what is shown in FIG. 14 and this description. For example, and in the illustrated embodiment, there are four filters for each of filter bank 1410 (related to orientation 7 from FIG. 8), filter bank 1412 (related to orientation 3 from FIG. 8), filter bank 1414 (related to orientation 8 from FIG. 8), and filter bank 1416 (related to orientation 2 from FIG. 8). For these filter banks, the first and fourth filters in the respective filter banks are shown by the lines in FIG. 14. In the illustrated embodiment, there are eight filters for each of filter bank 1418 (related to orientation 6 from FIG. 8) and filter bank 1420 (related to orientation 4 from FIG. 8). For these filter banks, the first and eighth filters for the respective filter banks are shown by the lines in FIG. 14. As illustrated in FIG. 14, the filters for filter bank 1418 and 1420 use interpolation at certain half pixel locations, even though only integer pixels are filtered. Values at these half-pixel locations can be computed, for example, using a bilinear filter. Furthermore, in FIG. 14, the current block (block $B_I$) is the 4×4 block of pixels located in the middle-right of each illustrated pixel group. Additionally, for the example filters shown in filter bank 1416 (related to orientation 8) and filter bank 1418 (related to orientation 2), some of the pixels used by the filters extend beyond the illustrated pixel group and are not shown. For example, $q_2$ and $q_3$ are not shown in the left-most filter shown in filter bank 1416, whereas $p_2$ and $p_3$ are not shown in the right-most filter shown in filter bank 1418. The position of these missing pixels, however, can be easily deduced as they are symmetrical with the pixel positions illustrated.

In one embodiment, if $p_3, \ldots, p_0, q_0, \ldots, q_3$ correspond to the selected pixels for a 1D filter, their values are modified as follows during directional deblocking:

$$p_n = (\lambda_{n,1}, \ldots, \lambda_{n,8})(p_3, \ldots, q_0, q_0, \ldots, q_3) + \lambda_{n,0}$$

$$q_n = (\lambda_{n,1}, \ldots, \lambda_{n,8})(q_3, \ldots, q_0, p_0, \ldots, p_3) + \lambda_{n,0} \quad (9)$$

where $\lambda_{n,m}$ is a filter coefficient. In a particular implementation, the filter coefficients are the same as those used in H.264/AVC and have a range of (0≤n≤2, 0≤m≤8). More specifically, in one particular implementation, the filter coefficients are computed using the methodology outlined in Section 8 of the H.264/AVC standard, which is described in International Telecommunication Union-Telecommunication (ITU-T), Recommendation H.264 (2003), or in any of the subsequent amendments or corrigendums.

According to the H.264/AVC standard, there are two thresholds α and β determined by the average QP employed over the block boundary, and deblocking only takes place if:

$$|p_0-q_0|<\alpha(QP)$$

$$|p_1-p_0|<\beta(QP)$$

$$|q_0-q_0|<\beta(QP) \quad (10)$$

As the deblocking performance depends on these thresholds, the two thresholds α and β should be carefully selected.

In embodiments of the directional deblocking filters described herein, the two thresholds α and β are also used to determine whether the directional deblocking filter should be applied, or whether the edge at the block boundary is an actual edge that should be preserved without filtering. The two thresholds are desirably selected by not only considering QP but also the directional mode. Because directional deblocking is performed along the edge orientation (or along approximately the edge orientation), the filter decision thresholds to distinguish edges from blocking degradation are relaxed in certain embodiments. For example, in one particular implementation, Expression (10) is modified with the following filter decision thresholds:

$$\alpha'=A(QP)B(m_f)\alpha$$

$$\beta'=A(QP)B(m_f)\beta' \quad (11)$$

where A is a magnification parameter related to QP, and B is a modulation parameter related to the directional mode $m_f$.

Figure 15:
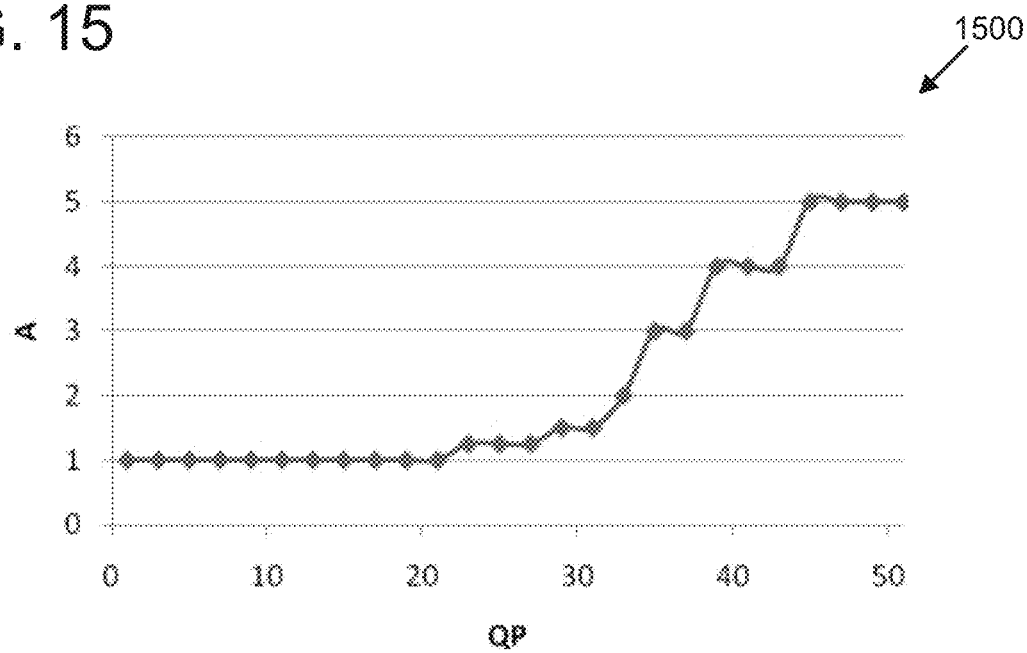
FIG. 15 is a graph showing a relationship between a magnification parameter A and a quantization parameter QP for determining thresholds in embodiments of the disclosed directional deblocking filters.

The magnification parameter A can be determined by evaluating a set of images containing typical directional edges. FIG. 15 is a graph 1500 showing the relationship between A and QP according to one particular embodiment. Using the relationships illustrated in FIG. 15, at high bit rate (low QP), image details are still well preserved, so directional deblocking is less encouraged to avoid smoothing anti-directional texture, while at low bit rate (high QP), directional deblocking can be much stronger, as it will not blur the remaining edges. The relationships shown in FIG. 15 should not be construed as limiting, however, as various other relationships can be used in embodiments of the disclosed technology. For example, other relationships can also increase the value of A as QP is correspondingly increased. Furthermore, the value of A need not increase in a step-wise fashion, but may increase more smoothly with increased QP.

The modulation parameter B can be defined according to a variety of different methods. In certain embodiments, for instance, the modulation parameter B is based on the observation that because blocking degradation is caused by different quantization in two adjacent blocks, it is most severe across the block boundary and least severe along the boundary. Consequently, and according to certain embodiments, deblocking should be stronger if its direction is more perpendicular to the boundary. Suppose, for example, that φ is the angle between the directional mode $m_f$ and the block boundary (refer to FIG. 6). According to one particular implementation, the value of B can then be computed as follows:

$$B(m_f)=\sin\varphi \quad (9)$$

Compared with the H.264/AVC deblocking, the use of one or more of the magnification parameter A and the modulation parameter B provides not only filter orientation flexibility but also filter threshold adaptivity.

E. Exemplary Extra Smoothing Filters

In certain embodiments, when the extra smoothing mode is selected, the filtering can involve pixels that are in a line perpendicular to the block boundary. For instance, in one particular implementation, extra smoothing is performed along lines perpendicular to the upper and left block boundaries, as shown in block diagram 1600 of FIG. 16. Suppose $p_{N-1}, \ldots, p_0, q_0, \ldots, q_{N-1}$ are the pixels in the same row or column of two adjacent blocks. In one exemplary implementation, the pixel values are modified as follows during the extra smoothing process:

$$p_n = \left(\sum_{i=0}^{i=n+\frac{N}{2}} p_i + \sum_{j=0}^{j=\frac{N}{2}-n-1} q_j\right)/(N+1) \quad (13)$$

$$q_n = \left(\sum_{i=0}^{i=\frac{N}{2}-n-1} p_i + \sum_{j=0}^{j=n+\frac{N}{2}} q_j\right)/(N+1)$$

$$0 \le n \le \frac{N}{2}-1, N = \begin{cases} 16 & \text{for luminance block} \\ 8 & \text{for chroma block} \end{cases}$$

Figure 16:
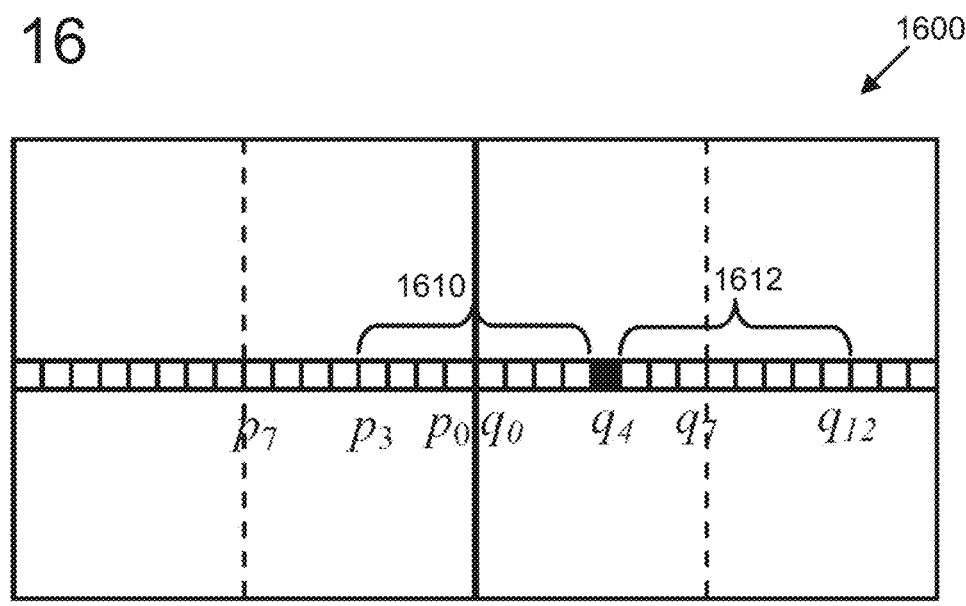
FIG. 16 is a schematic block diagram illustrating an exemplary extra smoothing filter as can be used in embodiments of the disclosed technology.

FIG. 16 shows an example of Expression (13). For example purposes, the vertical boundary of a luminance block is shown, although the smoothing filter can be adapted for a horizontal boundary. As shown in FIG. 16, $p_7, \ldots, p_0, q_0, \ldots, q_7$ are the pixels to be filtered. FIG. 16 further shows particularly the filtering of $q_4$. Specifically, the filtered value of $q_4$ is obtained by averaging $p_3, \ldots, p_0, q_0, \ldots, q_{12}$ (shown in brackets 1610, 1612). Expression (13) should not be construed as limiting, however, as there exist a variety of modifications to the pixel values that can be performed to achieve a smoothing effect. The smoothing performed by expression (13) represents a heavy and long distance smoothing across the block boundary and pixels in a consecutive non-LDF region. For example, the smoothing filter is long distance in that it is applied to more than three pixels in each of the adjacent blocks. For instance, in one exemplary implementation, the filter is applied to 8 pixels in each of the adjacent blocks when the blocks are 16×16 luminance blocks and 4 pixels in each of the adjacent blocks when the blocks are 8×8 chrominance blocks. Other numbers of pixels in adjacent blocks can also be filtered by the smoothing filter. Furthermore, in certain embodiments, no boundary strength or filter thresholds are used with the extra smoothing mode.

F. An Exemplary Deblocking Process

Figure 7:
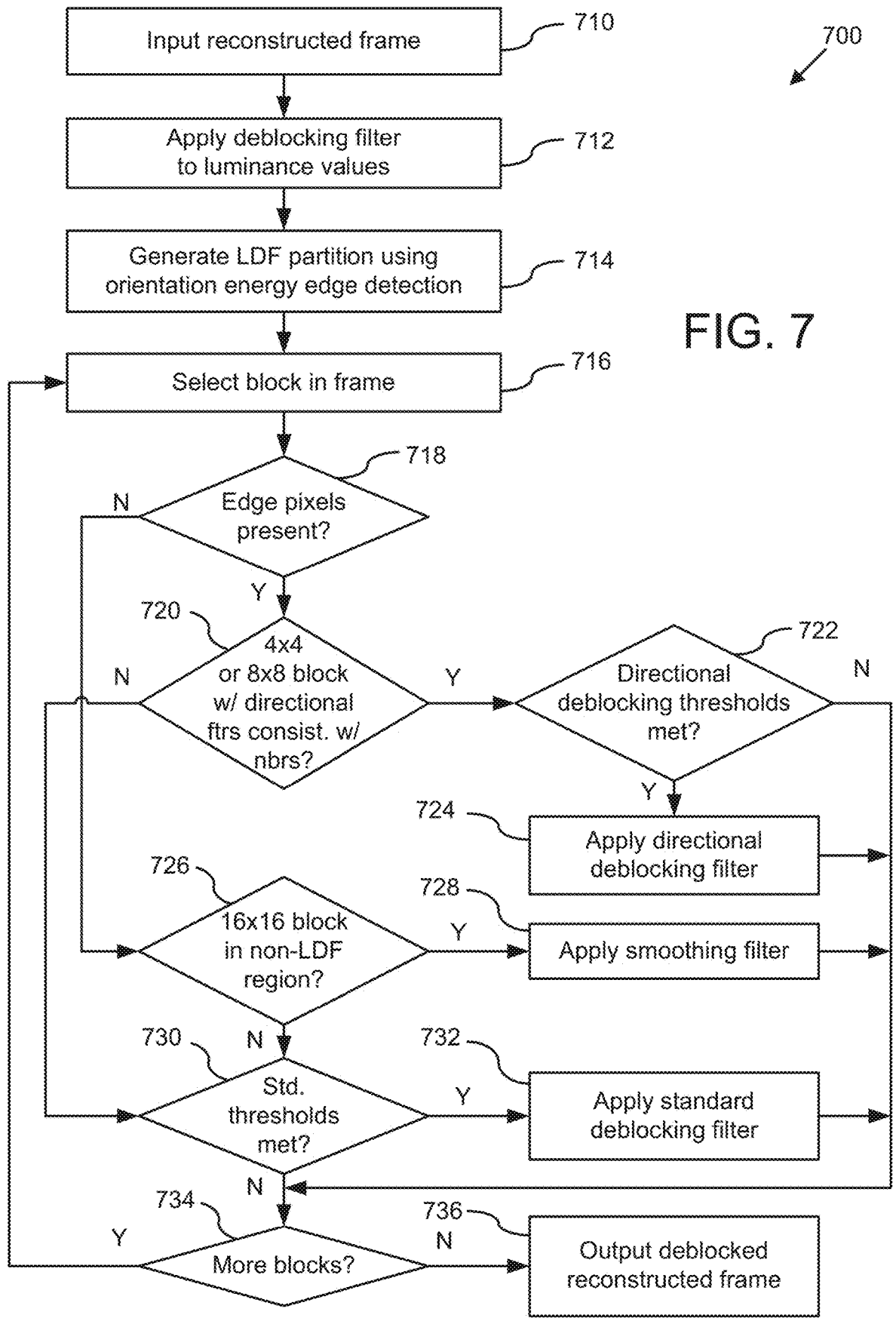
FIG. 7 is a flowchart of a more specific embodiment of a deblocking process according to the disclosed technology.

FIG. 7 is a flowchart shown an exemplary deblocking process 700. The illustrated method should not be construed as limiting, however, as any one or more of the illustrated acts can be performed alone or in various combinations and subcombinations with other deblocking processes.

At 710, a reconstructed frame is input (e.g., buffered or loaded into a memory or otherwise received for processing). The reconstructed frame can be input, for example, after a predicted frame is combined with the reconstructed error as part of the motion compensation/estimation loop in an encoder or decoder.

At 712, an initial deblocking filter is applied to the luminance values of the video frame. In one particular implementation, the initial deblocking filter is a standard deblocking filter, such as the H.264/AVC filter.

At 714, edges in the video frame are detected using orientation energy edge detection ("OEED"). For example, an LDF partition is generated using the OEED filters described above with respect to FIG. 8 and Expressions (1) to (5).

At 716, a block of the video frame is selected. The block can be selected in a raster fashion (from left to right starting with the top row). The block can alternatively be selected in another fashion (e.g., top-to-bottom wipe or box-out fashion).

At 718, the selected block is evaluated to determine whether edge pixels are present in the selected block. This determination can be made, for example, by evaluating the LDF partition, which can mark those blocks that comprise one or more pixels identified as edge pixels after OEED (e.g., one or more edge pixels that satisfy Expression (5)). If edge pixels are present in the selected block, then the process proceeds at 720; otherwise, the process proceeds at 726.

At 720, the selected block is evaluated to determine whether the block is an 8×8 or 4×4 block and whether the one or more directional features in the selected block are consistent with one or more neighboring blocks (e.g., the upper and leftward neighboring blocks). This determination can be made, for example, by evaluating the block size and the orientation averages and orientation variances of the selected block as well as the neighboring blocks (e.g., using expression (6) and (7)). In certain implementations, the directional features of the selected can be further evaluated to determine if they are horizontal or vertical. If the directional features of the selected block are consistent with the neighboring blocks and if the selected block is an 8×8 or 4×4 block (and, in certain implementations, if the directional features are non-vertical and non-horizontal), then the process proceeds with a directional deblocking scheme at 722; otherwise, the process proceeds at 730 with the standard deblocking mode.

At 722, the selected block is evaluated to determine if certain directional deblocking thresholds are met. For example, the directional deblocking filter thresholds of Expression (10) are evaluated using the modifications to α and β shown in Expressions (11) and (12) and FIG. 15. If the thresholds are satisfied, then a directional deblocking filter having the appropriate orientation is applied at 724 (e.g., one of the directional deblocking filters shown in FIG. 14). If the thresholds are not satisfied, then no deblocking filter is applied, and the process proceeds at 734.

Returning to 726, the selected block is evaluated to determine if the block is a 16×16 block in a consecutive non-LDF region. This determination can be made, for example, by evaluating the block size and the intensity variances of the selected block as well as the intensity variances of one or more neighboring blocks (e.g., the upper and leftward blocks). This evaluation can be made, for example, using Expression (8). If the selected block is a 16×16 block in a consecutive non-LDF region, then an extra smoothing filter is applied at 728. The smoothing filter can be the smoothing filter of Expression (13). If the selected block is not a 16×16 block in a consecutive non-LDF region, then a standard deblocking filter can be applied at 730.

At 730, the selected block is evaluated to determine whether it meets the standard deblocking filter activation thresholds (e.g., the thresholds shown in Expression (10)). If the thresholds are met, then a standard deblocking filter is applied at 732 (e.g., the standard H.264/AVC filter). If the thresholds are not met, then the selected block is not filtered with any deblocking filter.

With the selected block having been filtered using either a directional deblocking filter, a smoothing filter, or the standard deblocking filter or having not been filtered because of the filter activation thresholds not being met, the process continues at 734, where an evaluation is made to determine if any further blocks in the reconstructed image remain. If so, the process returns to 716, where the next block is selected. Otherwise, the process terminates for the video frame.

G. Experimental Results

Experiments were performed using an embodiment of the disclosed technology. In particular, experiments were performed using an embodiment of the deblocking scheme shown in FIG. 7 with the 8 OEED filters shown in FIG. 8 and described by Expressions (1) to (5), the deblocking modes being selected by Expressions (6) to (8), the directional deblocking filters of FIG. 14 and described by Expression (9) with thresholds determined by Expressions (10) to (12) and FIG. 15, the smoothing filter shown by FIG. 7 and described by Expression (13), and with the H.264/AVC deblocking scheme as the standard deblocking mode. This exemplary embodiment was tested using a variety of sequences provided by MPEG/VCEG for HVC (High-performance Video Coding) testing. The videos were coded in an IPPP structure, with 9 or 11 P-frames between every two I-frames. The frame rate was set to 10 fps or 12 fps, and a total of 10 seconds were coded within each sequence. The three thresholds $T_1$, $T_2$ and $T_3$ for the deblocking mode decisions were set to 2, 3, and 12, respectively.

The results were compared with results from the regular H.264/AVC deblocking scheme as well as from the intra-predictive deblocking scheme described in Jeong. The experiments were only performed on I-frames, but the quality of inter-prediction for P-fames was similarly improved.

Figure 17:
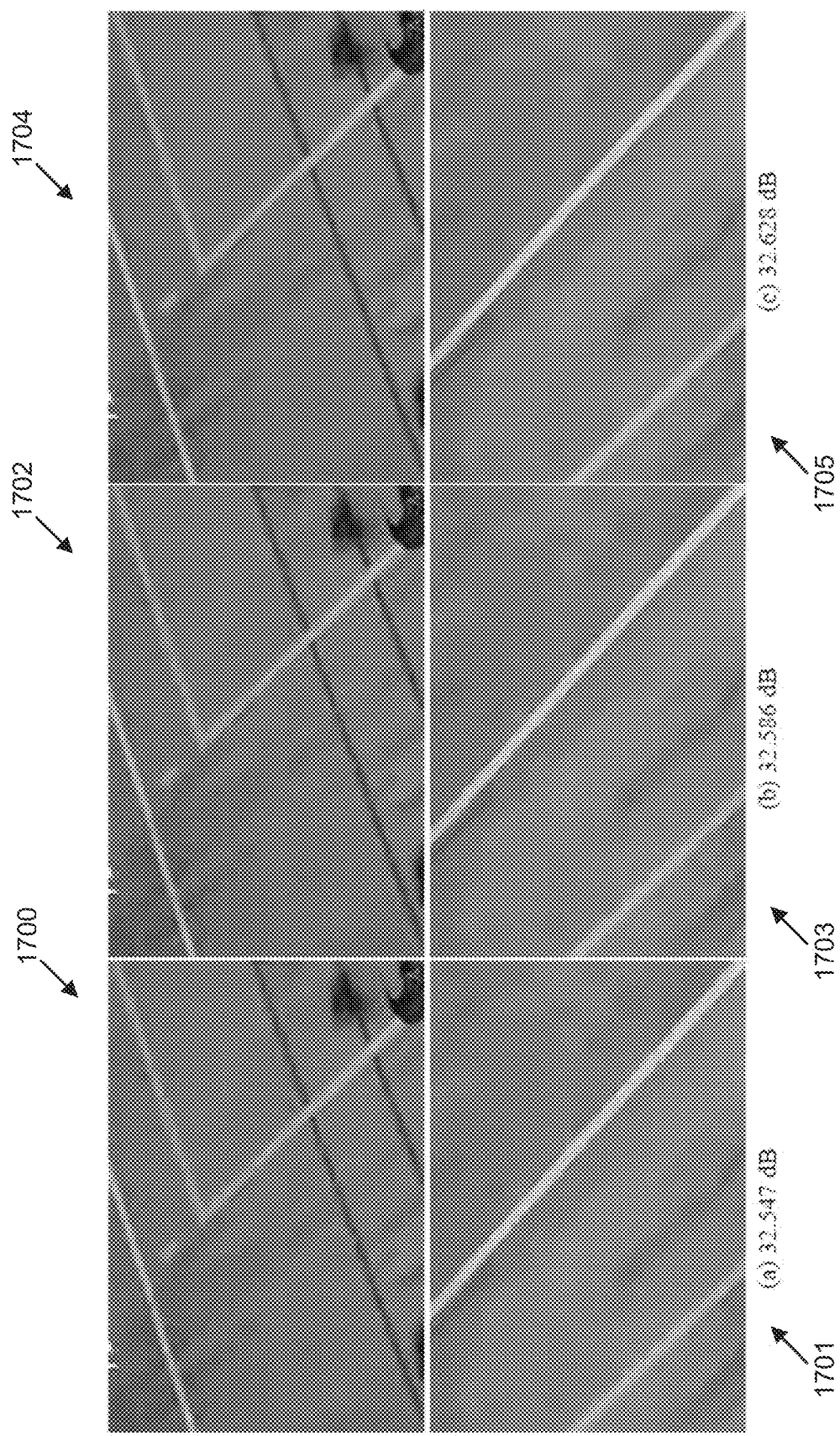
FIGS. 17-19 show multiples images highlighting the improved performance of an exemplary embodiment of the disclosed deblocking processes compared to a conventional deblocking process.

FIG. 17 shows images 1700, 1701 obtained from H.264/AVC deblocking, images 1702, 1703 obtained from intra-predictive deblocking, and images 1704, 1705 obtained using the exemplary method. Each image includes LDF regions in an I-frame. It can be observed that artifacts still remain around the lines in images 1700, 1701 after H.264/AVC deblocking. Furthermore, when compared with the intra-predictive deblocking images 1702, 1703, the images 1704, 1705 from the exemplary embodiment show improved removal of visual artifacts, making the lines clearer and cleaner.

Figure 18:
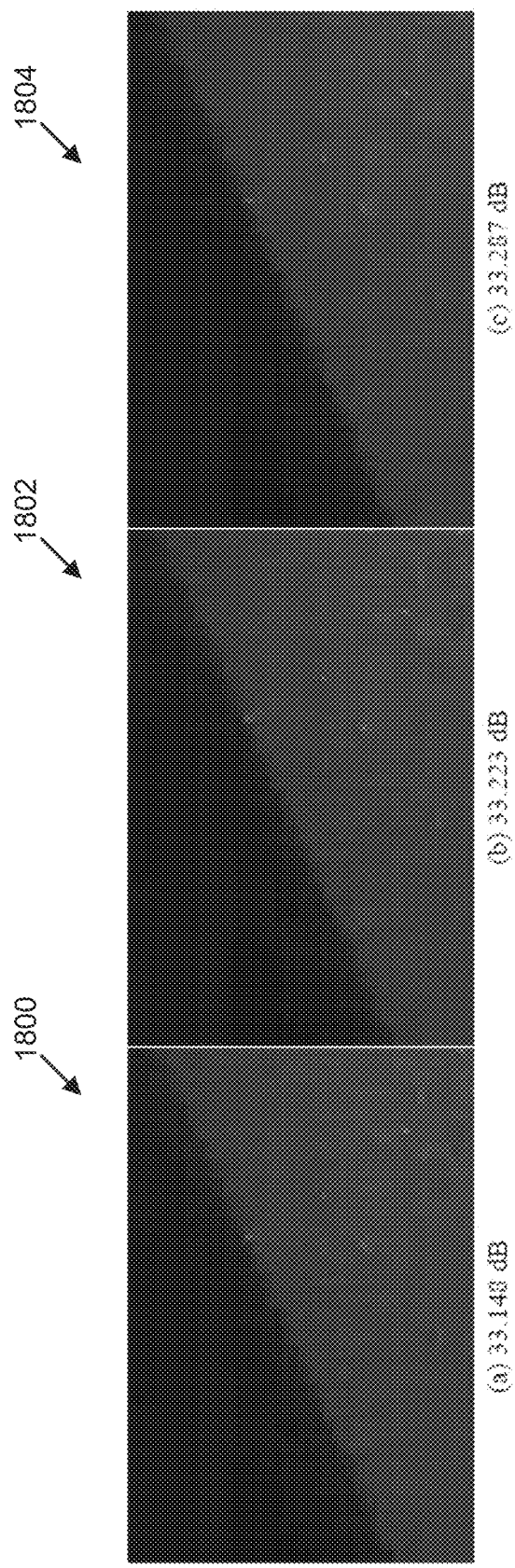

FIG. 18 shows images 1800, 1802, and 1804 of consecutive non-LDF regions taken from an I-frame. Image 1800 is a block-DCT compressed video frame with no deblocking. As can be seen in image 1800, the block-DCT compressed video frame is susceptible to severe blocking artifacts in large smooth regions. Image 1802 shows the video frame after being deblocked with the H.264/AVC deblocking scheme. As seen in image 1802, traditional H.264/AVC deblocking cannot effectively eliminate these artifacts. Image 1804 is the video frame after being deblocked using the exemplary embodiment. As can be seen in image 1804, deblocking using the exemplary embodiment results in an image that is improved over the deblocking observed in image 1800 and 1802.

Figure 19:
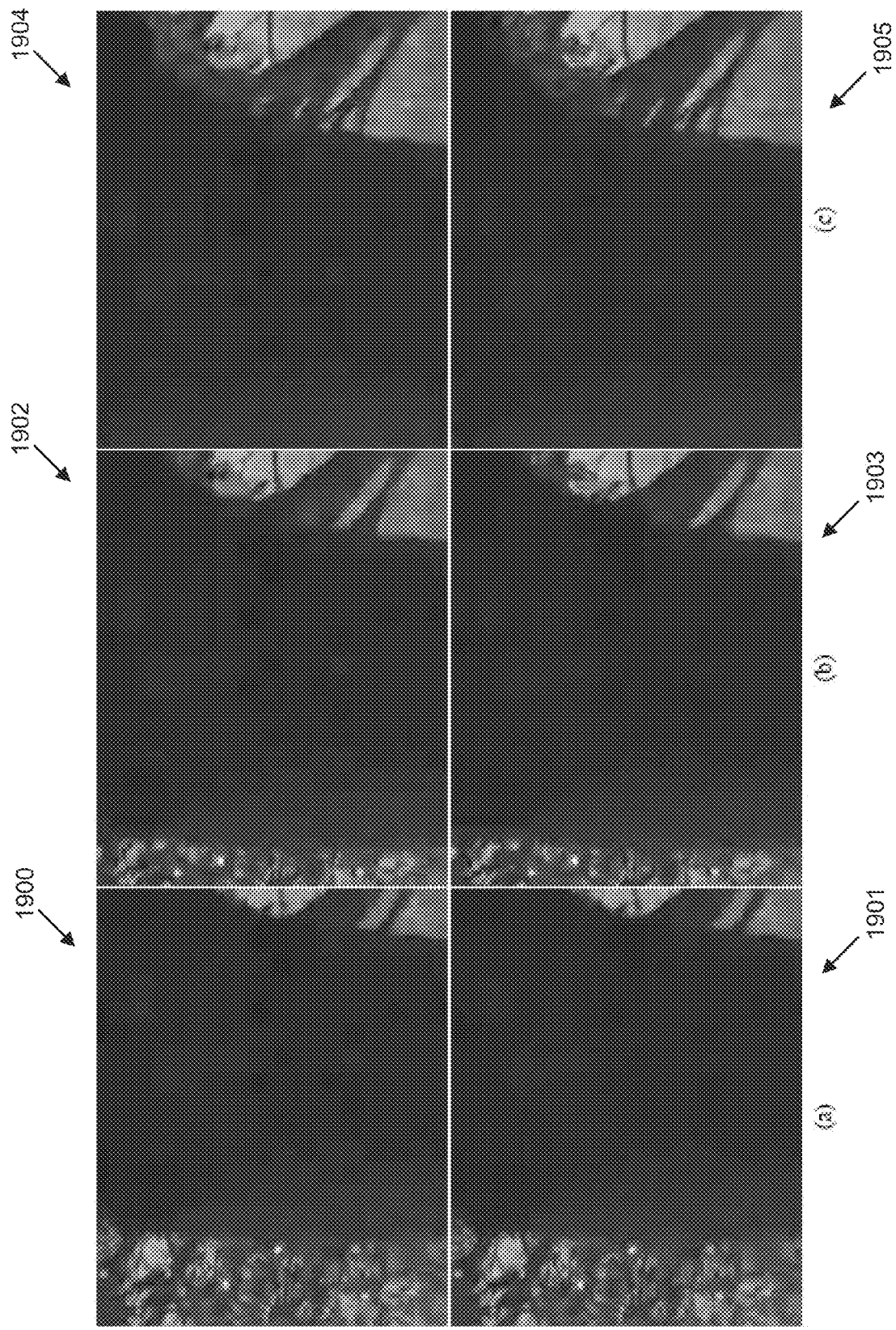

FIG. 19 shows comparison results for different frame types. In particular, images 1900 and 1901 show deblocking applied to an I-frame using the H.264/AVC deblocking technique (image 1900) and the exemplary embodiment (image 1901). Images 1902 and 1903 show deblocking applied to a second P-frame using the H.264/AVC deblocking technique. Although both images 1902 and 1903 are deblocked using the H.264/AVC deblocking technique, the P-frame of image 1903 is predicted from the I-frame of image 1901, which was deblocked using the exemplary embodiment. Images 1904 and 1905 show deblocking applied to a fourth P-frame using the H.264/AVC deblocking technique. Although both images 1904 and 1905 are deblocked using the H.264/AVC deblocking technique, the P-frame of image 1905 is predicted from the I-frame of image 1901, which was deblocked using the exemplary embodiment. As can be seen in images 1901, 1903, and 1905, the blocking artifacts are more effectively reduced not only on the I-frame but also on the P-frames when using the exemplary embodiment.

The exemplary embodiments disclosed herein are capable of improving the visual quality of block-DCT compressed video at low bit-rate, which is highly demanded in the next generation of video coding standards. Because the blocking artifacts are effectively removed using the exemplary embodiment, the objective quality of the image is typically improved. Some peak signal-to-noise ratio results for the exemplary embodiment are shown in table 2000 of FIG. 20. Table 2000 also shows the average percentage of "mode B" (which corresponds to the extra smoothing mode) and "mode C" (which corresponds to directional deblocking with the directional deblocking filters of FIG. 14 and described by Expression (9) and with thresholds determined by Expressions (10) to (12) and FIG. 15) selected during deblocking of the tested I-frames.

Having illustrated and described the principles of the illustrated embodiments, it will be apparent to those skilled in the art that the embodiments can be modified in arrangement and detail without departing from such principles. For example, the disclosed deblocking techniques are not limited to in-loop deblocking, but can also be used to perform post-processing deblocking in certain implementations.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. One or more non-transitory computer-readable media having stored thereon computer-executable instructions for causing one or more processing units, when programmed thereby, to perform operations comprising:
   receiving, in a bitstream for at least part of a video sequence, encoded data for a video frame of the video sequence;
   reconstructing, using the encoded data, the video frame;
   buffering the reconstructed video frame;
   applying a deblocking filter to at least one component of the reconstructed video frame, including applying the deblocking filter to luminance values of the reconstructed video frame, thereby producing a deblocked, reconstructed video frame;
   for a block in the deblocked, reconstructed video frame, determining edge locations throughout the block based at least in part on analysis of pixel values of the block in the deblocked, reconstructed video frame;
   selecting a filter from two or more candidate filters associated with different edge orientations, the two or more candidate filters including a candidate filter associated with a horizontal edge orientation, a candidate filter associated with a vertical edge orientation, and multiple candidate filters associated with different diagonal edge orientations; and
   selectively applying the selected filter to the block.

2. The one or more computer-readable media of claim 1, wherein the reconstructing, the buffering, the applying the deblocking filter, the determining, the selecting, and the selectively applying the selected filter are performed in a motion compensation loop of a video decoder.

3. The one or more computer-readable media of claim 1, wherein the selectively applying the selected filter includes evaluating one or more application thresholds such that the selected filter is applied at the edge locations determined based at least in part on the analysis of pixel values of the block.

4. The one or more computer-readable media of claim 1, wherein the operations further comprise repeating the determining, the selecting, and the selectively applying the selected filter for each of one or more other blocks.

5. The one or more computer-readable media of claim 1, wherein the multiple candidate filters associated with different diagonal edge orientations include:
   a candidate filter associated with a 45 degree edge orientation; and
   a candidate filter associated with a 135 degree edge orientation.

6. The one or more computer-readable media of claim 1, wherein the operations further comprise:
   receiving, in the bitstream, a flag for the video sequence; and
   determining, based at least in part on the flag, to perform the determining edge locations, the selecting, and the selectively applying the selected filter.

7. The one or more computer-readable media of claim 1, wherein the operations further comprise:
   receiving, in the bitstream, a flag for the video frame; and
   determining, based at least in part on the flag, to perform the determining edge locations, the selecting, and the selectively applying the selected filter.

8. The one or more computer-readable media of claim 1, wherein the operations further comprise:
   receiving, in the bitstream, a flag for part of the video frame; and
   determining, based at least in part on the flag, to perform the determining edge locations, the selecting, and the selectively applying the selected filter.

9. The one or more computer-readable media of claim 1, wherein at least one of the two or more candidate filters is a smoothing filter configured to remove discontinuity artifacts while preserving real edges.

10. The one or more computer-readable media of claim 1, wherein the selectively applying the selected filter includes evaluating, using the edge locations determined based at least in part on the analysis of pixel values of the block, whether or not to apply the selected filter.

11. One or more non-transitory computer-readable media having stored thereon encoded data, in a bitstream for at least part of a video sequence, for a video frame of the video sequence, the encoded data having been encoded with a video encoder, implemented in a computer system comprising one or more processing units and memory, by operations comprising:

encoding the video frame;
reconstructing the video frame;
buffering the reconstructed video frame;
applying a deblocking filter to at least one component of the reconstructed video frame, including applying the deblocking filter to luminance values of the reconstructed video frame, thereby producing a deblocked, reconstructed video frame;
for a block in the deblocked, reconstructed video frame, determining edge locations throughout the block based at least in part on analysis of pixel values of the block in the deblocked, reconstructed video frame;
selecting a filter from two or more candidate filters associated with different edge orientations, the two or more candidate filters including a candidate filter associated with a horizontal edge orientation, a candidate filter associated with a vertical edge orientation, and multiple candidate filters associated with different diagonal edge orientations; and
selectively applying the selected filter to the block.

12. The one or more computer-readable media of claim 11, wherein the bitstream includes one or more of a flag for the sequence, a flag for the video frame, and a flag for part of the video frame, and wherein the operations further comprise:

determining, based at least in part on the one or more of the flag for the sequence, the flag for the video frame, and the flag for part of the video frame, to perform the determining edge locations, the selecting, and the selectively applying the selected filter.

13. The one or more computer-readable media of claim 11, wherein the selectively applying the selected filter includes evaluating, using the edge locations determined based at least in part on the analysis of pixel values of the block, whether or not to apply the selected filter.

14. In a computer system that implements a video encoder, a method comprising:

encoding a video frame of a video sequence;
reconstructing the video frame;
buffering the reconstructed video frame;
applying a deblocking filter to at least one component of the reconstructed video frame, including applying the deblocking filter to luminance values of the reconstructed video frame, thereby producing a deblocked, reconstructed video frame;
for a block in the deblocked, reconstructed video frame, determining edge locations throughout the block based at least in part on analysis of pixel values of the block in the deblocked, reconstructed video frame;
selecting a filter from two or more candidate filters associated with different edge orientations, the two or more candidate filters including a candidate filter associated with a horizontal edge orientation, a candidate filter associated with a vertical edge orientation, and multiple candidate filters associated with different diagonal edge orientations;
selectively applying the selected filter to the block; and
outputting, in a bitstream for at least part of the video sequence, encoded data for the video frame.

15. The method of claim 14, wherein the reconstructing, the buffering, the applying the deblocking filter, the determining, the selecting, and the selectively applying the selected filter are performed in a motion compensation loop of the video encoder.

16. The method of claim 14, further comprising repeating the determining, the selecting, and the selectively applying the selected filter for each of one or more other blocks.

17. The method of claim 14, wherein the multiple candidate filters associated with different diagonal edge orientations include:

a candidate filter associated with a 45 degree edge orientation; and
a candidate filter associated with a 135 degree edge orientation.

18. The method of claim 14, wherein at least one of the two or more candidate filters is a smoothing filter.

19. The method of claim 18, wherein the smoothing filter is configured to remove discontinuity artifacts while preserving real edges.

20. The method of claim 14, wherein the selectively applying the selected filter includes evaluating, using the edge locations determined based at least in part on the analysis of pixel values of the block, whether or not to apply the selected filter.

* * * * *